United States Patent

Minakuchi et al.

[11] Patent Number: 5,930,787
[45] Date of Patent: Jul. 27, 1999

[54] METHOD FOR RETRIEVING RELATED WORD INFORMATION, INFORMATION PROCESSING APPARATUS, METHOD FOR CONTROLLING RELATED INFORMATION DISPLAY, AND RELATED INFORMATION DISPLAY APPARATUS

[75] Inventors: Mitsuru Minakuchi, Soraku-gun; Koichi Kashiwagi, Tenri; Toshiyuki Masui, Meguro-ku, all of Japan

[73] Assignee: Sharp Kabushiki Kaisha, Osaka, Japan

[21] Appl. No.: 08/723,188

[22] Filed: Sep. 27, 1996

[30] Foreign Application Priority Data

Sep. 27, 1995 [JP] Japan .................................. 7-249980
Sep. 27, 1995 [JP] Japan .................................. 7-249981

[51] Int. Cl.$^6$ ................................................ G06F 17/00
[52] U.S. Cl. ....................... 707/4; 707/2; 707/5; 707/501
[58] Field of Search ................................... 707/501–534, 707/1–206

[56] References Cited

U.S. PATENT DOCUMENTS

| | | | |
|---|---|---|---|
| 5,619,709 | 4/1997 | Caid et al. | 707/532 |
| 5,630,121 | 5/1997 | Braden-Harder | 707/102 |
| 5,630,125 | 5/1997 | Zellweger | 707/103 |

OTHER PUBLICATIONS

M. Okubo, et al., "Information Retrieval Apparatus", Japanese Laid–Open Patent Publication No. 5–233717, Laid-Open Publ. Date: Sep. 10, 1993.

M. Okubo, et al., "Information Retrieval Display Apparatus", Japanese Laid–Open Patent Publication No. 5–233718, Laid–Open Publ. Date: Sep. 10, 1993.

H. Kato, "Attached Data Display Processing System", Japanese Laid–Open Patent Publication No. 3–10368, LaidOpen Publ. Date: Jan. 17, 1991.

Primary Examiner—Wayne Amsbury
Assistant Examiner—David Yink Jung
Attorney, Agent, or Firm—David G. Conlin, Esq.; Dike, Bronstein, Roberts & Cushman, LLP; Richard E. Gamache

[57] ABSTRACT

An information processing apparatus includes: an input device for receiving input information; a display device for displaying information on a display screen; and a database for storing words and information related to the words to allow information related to a related word related to an input word be retrieved. The apparatus further includes: a display region setting section for setting a size of a related word information display region for displaying the information related to the related word on the display screen depending on an input via the input device; a relation level range setting section for setting a range of a relation level between the word and a related word related to the word; a display controller for displaying the related word information display region of which size has been set on the display screen; and a display information determining section for determining a type of a related word to be displayed on the related word information display region and an information amount of the related word.

15 Claims, 27 Drawing Sheets

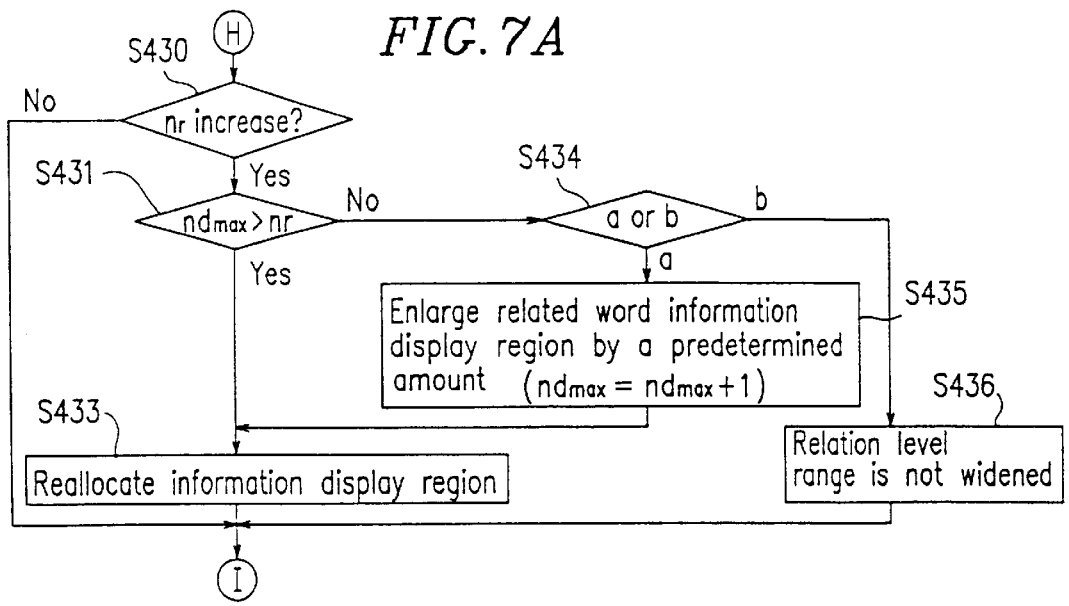
FIG. 7A
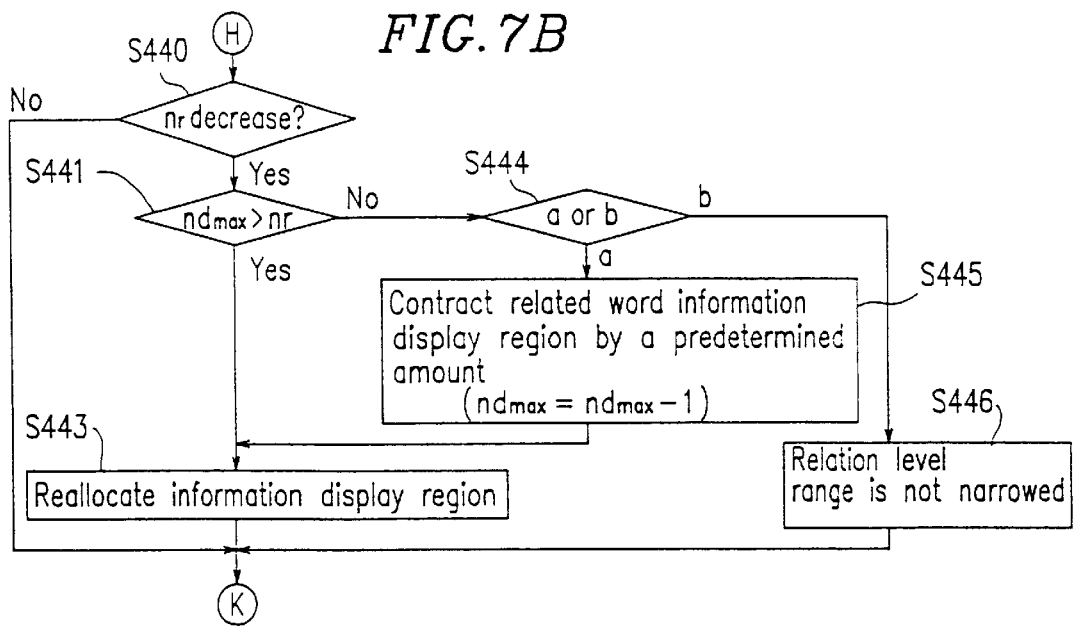
FIG. 7B
FIG. 7C

FIG. 13

| | |
|---|---|
| abaci | abacusの複数形 |
| aback | 後へ，後ろに |
| abacus | そろばん |
| abaft | 船尾に（へ） |
| abalone | アワビ |
| abandon | 捨て去る |
| abandoned | 見捨てられた |
| ⋮ | ⋮ |

FIG. 14

| X-coordinate | Y-coordinate | Place/building name information |
|---|---|---|
| 2770 | 2126 | Todai-ji |
| 905 | 1255 | JR Nara Station |
| 2035 | 1494 | Kofuku-ji |
| 1750 | 1090 | Kura |
| 1016 | 3266 | Nara Dreamland |
| 1625 | 1592 | Kintetsu Nara Station |
| 2128 | 1700 | Nara Prefectural Office |
| ⋮ | ⋮ | ⋮ |

FIG.15

| Place/building name information | Image information | Text information |
|---|---|---|
| Todai-ji | Todaiji.rgb | Todaiji.txt |
| JR Nara Station | JRNaraEki.rgb | JRNaraEki.txt |
| Kofuku-ji | Koufukuji.rgb | Koufukuji.txt |
| Kura | Kura.jpg | Kura.txt |
| Nara Dreamland | NaraDreamLand.tiff | NaraDreamLand.txt |
| Kintetsu Nara Station | KintetsuNaraEki.rgb | KintetsuNaraEki.txt |
| Nara Prefectural Office | NaraKencho.gif | NaraKencho.txt |
| . | . | . |
| . | . | . |

FIG.16

| Event sequence | Help message |
|---|---|
| Icon upper | "%s", $ type of icon $ |
| Window upper | "window of %s", $directory path $ |
| Icon-selection | "% $ selected", $ file name $ |
| Icon-selection-drag | "dragging the icon" |
| Icon-selection-drag-window | "copying the file" |
| Icon-selection-drag-trash | "erasing the file" |
| . | . |
| . | . |

METHOD FOR RETRIEVING RELATED WORD INFORMATION, INFORMATION PROCESSING APPARATUS, METHOD FOR CONTROLLING RELATED INFORMATION DISPLAY, AND RELATED INFORMATION DISPLAY APPARATUS

BACKGROUND OF THE INVENTION

1. Field of the Invention

The present invention relates to a method for retrieving related word information, an information processing apparatus employing this method, a method for controlling related information display, and a related information display apparatus employing this method.

2. Description of the Related Art

In a conventional information retrieval system, when the user inputs a word into the system to retrieve information related to the word (hereinafter, such information is referred to as related word information) from a database, the following procedure is normally conducted: upon receipt of a word from the user, the system determines the level of the relationship (relation level) between the input word and another word (related word) or the relation level between the input word and information related to the input word (related information) by calculating a predetermined expression or referring to an information table and the like and making a list of related words sorted from a word with a higher relation level to a word with a lower relation level.

Japanese Laid-Open Patent Publication No. 5-233717 and No. 5-233718 disclose information retrieval apparatuses which calculate the relation level between information input by the user and information stored in a database, and, on receipt of a relation level input by the user, displays information corresponding to the input relation level.

With the recent enhancement in the performance of computers, the amount of data handled by computers has become enormous. When an information retrieval system used in such a computer retrieves data from an enormous database, the amount of resultant retrieved data tends to be large.

In conventional information retrieval systems, large amounts of retrieved data are displayed in the following exemplified manners. A scroll bar is provided on the portion of a display screen where the retrieved results are displayed to allow the user to scroll the list of retrieved results. Alternatively, a multi-stage menu method is adopted, where each retrieved result is divided into a plurality of groups, each group further divided into a plurality of parts, wherein a plurality of parts being displayed as a group unit.

However, in such conventional information retrieval systems the listing of retrieved results is so ineffective that the work required to search a desired information item is inefficient.

The above problem may be solved to some extent by the method disclosed in aforementioned Japanese Laid-Open Patent Publication No. 5-233717 and No. 5-233718, where only items corresponding to the relation level specified by the user are displayed. However, there is a possibility that a retrieved information item desired by the user may not be included in the displayed information items corresponding to the relation level specified by the user. Therefore, this method is not a substantial solution of the problem.

Conventionally, in related information display apparatuses used for document edit processing systems such as wordprocessors and computer systems, in order to display information related to an information unit displayed on a display screen, the user must discontinue the current work to follow a procedure for retrieving related information and displaying the retrieved information.

For example, in document edit processing systems such as wordprocessors, there has been a system developed where appended information can be edited on a memo screen, and the like, the edition of original document information. In such a system, the original document and the document on the memo screen are handled separately. Therefore, in order to display the appended information, the user must input an instruction to display the appended information on the memo screen.

As another example, an application program has been developed where detailed information on an information unit displayed on a display screen can be displayed by menu selection at any time. To use this function, the user must take some intentional action, that will result in the discontinuation of the current work on the original screen.

Japanese Laid-Open Patent Publication No. 3-10368 proposes an appended information display processing method to improve the above troublesome operation required for displaying appended information. In this method, a unit of document information is stored together with corresponding appended information. The system determines whether or not an information unit on a display screen indicated by a cursor has its corresponding appended information, and if it has, displays the appended information on an appended information display region of the display screen.

However, in the above method, since the appended information needs to correspond to a certain information unit of the document (e.g., a word), general information such as dictionary information and address information cannot be used. Therefore, only related information linked to a certain information unit of the displayed document can be obtained, and thus the range of retrieval is narrow. If more detailed retrieved information is desired, a larger amount of related information must be stored for every information unit of the document displayed. Further, in this method, appended information linked to a certain information unit of the document indicated by the cursor is retrieved. Therefore, since the detection of information is restricted to the linked information, the application thereof is restricted.

SUMMARY OF THE INVENTION

According to one aspect of the present invention, a method for retrieving related word information in an apparatus including an input device for receiving an input word and control information, a database for storing a plurality of words, and a display device for displaying at least one of the plurality of words, wherein the at least one of the plurality of words stored in the database is retrieved is provided. The method includes the steps of: changing a size of a related word information display region on the display device based on the control information; setting a range of a relation level between the word and a related word related to the word; determining an information amount of the related word to be displayed on the related word information display region based on the size of the related word information display region and the set relation level range, and determining a type of the related word; retrieving the related word based on the determined type and the determined information amount; and displaying the retrieved related word on the related word information display region.

In one embodiment of the invention, a method further includes the step of setting a predetermined relation level range when all related words stored in the database and related to the word can be displayed on the related word information display region.

In another embodiment of the invention, a method further includes the step of displaying the related word information display region and a relation level range setting region for setting the relation level on the display device when a specific word is input via the input device.

In still another embodiment of the invention, a relation level between two words stored in the database is stored in the database.

In yet another embodiment of the invention, a method further includes the step of calculating a relation level between a word which is not stored in the database and a word stored in the database using the relation level stored in the database.

According to another aspect of the present invention, an information processing apparatus includes: an input device for receiving input information; a display device for displaying information on a display screen; and a database for storing words and information related to the words to allow information related to a related word related to an input word be retrieved. The apparatus further includes: a display region setting section for setting a size of a related word information display region for displaying the information related to the related word on the display screen depending on an input via the input device; a relation level range setting section for setting a range of a relation level between the word and a related word related to the word; a display controller for displaying the related word information display region of which size has been set on the display screen; and a display information determining section for determining a type of a related word to be displayed on the related word information display region and an information amount of the related word, wherein a related word is retrieved from words belonging to the determined type with the determined information amount.

According to still another aspect of the present invention, a related information display apparatus includes: an information memory for storing reference information, specific related information, and general information; a display for displaying information stored in the information memory on a display screen; a pointing device for pointing to a position on the display screen designated by a user; an operation processor for controlling to secure an information unit of the reference information displayed at the pointed position, select related information related to the information unit from the specific related information and the general information stored in the information memory at at least one stage, and display the selected related information on the display screen of the display.

According to yet another aspect of the present invention, a related information display apparatus includes: an information memory for storing reference information, specific related information, and general information; a display for displaying information stored in the information memory on a display screen; a pointing device for pointing to a designated position on the display screen; a designated position securing section for securing the pointed position; an information securing section for securing a portion of the reference information displayed at the secured designated position; a related information selector for selecting related information related to the portion of the reference information from the specific related information and the general information stored in the information memory at at least one stage; and a related information display controller for controlling to display the selected related information on the display screen of the display.

According to yet another aspect of the present invention, a related information display apparatus includes: an information memory for storing specific related information and general information; a display for displaying information stored in the information memory on a display screen; an input section for receiving input information; a detector for detecting the input information; an operation processor for controlling to select related information related to the input information from the specific related information and the general information stored in the information memory at at least one stage and display the selected related information on the display screen of the display.

In one embodiment of the invention, the general information includes dictionary information, map information, address information, telephone number information, text information, and image information including motion pictures and photographs.

In another embodiment of the invention, a related information display apparatus further includes a range indicator for indicating a securing range of an information unit of the reference information displayed at the pointed position.

In still another embodiment of the invention, a related information display apparatus further includes a type setting section for presetting a type of related information to be displayed on the display screen.

According to yet another aspect of the present invention, a method for controlling related information display includes the steps of: displaying reference information on a display screen of a display; selecting related information related to a portion of the reference information displayed at a designated position from specific reference information and general information stored in an information memory at at least one stage; and displaying the selected related information on the display screen of the display.

According to yet another aspect of the present invention, a method for controlling related information display includes the steps of: detecting whether or not information has been input; selecting related information related to the information from specific reference information and general information stored in an information memory at at least one stage; and displaying the selected related information on a display screen.

According to yet another aspect of the present invention, a method for controlling related information display includes the steps of: detecting whether or not operation has been conducted; selecting related information related to a content of the operation from specific reference information and general information stored in an information memory at at least one stage; and displaying the selected related information on a display screen.

Thus, according to the present invention, the type of related words related to an input word and the quality of information, i.e., the amount of information related to each related word to be displayed on the display screen, can be changed in real time depending on the size of the related word information display region with respect to the display screen and the range of the relation level between the input word and the related words. This makes it possible to ensure effective listing of the retrieved results while allowing the user to swiftly find a desired retrieved result. The related information can be displayed more efficiently by restricting the relationship between the size of the related word information display region and the relation level range.

Also, according to the present invention, related information of information designated by the user, information input by the user, and information related to operation, and the like, can be automatically retrieved and displayed. Accordingly, the user can smoothly continue current work while referring to the related information in real time without conducting an intentional operation for the retrieval and display which may cause averting the user's eyes or interrupting the user's train of thought. This provides excellent man-machine interface. Moreover, retrieval is conducted at one stage or multiple stages using specific related information together with general information. Accordingly, the search range is widened and diversified, and thus more detailed information can be retrieved.

Information related to an information unit of reference information displayed on the screen is automatically retrieved and displayed. At the same time, information related to the input and operation can also be automatically retrieved and displayed in real time. This widens the application range.

Related information to be selected can be narrowed by specifying the range of an information unit of reference information displayed on the screen. Thus, more accurate retrieval can be achieved.

Information desired by the user can be correctly obtained by presetting the type of related information to be displayed.

Thus, the invention described herein makes possible the advantages of (1) providing a method for retrieving related word information where related words and the quality of information related to each related word to be displayed are changed in real time, depending on the size of the related word information display region and the relation level range, to ensure the swift locating of a desired retrieved result from an effective list of retrieved results; (2) providing an information processing apparatus employing such a method; (3) providing a method for controlling related information display where related information of information designated by the user is automatically retrieved and displayed providing excellent man-machine interface, wherein the search range is widened by using general information as well as specific information, and the application range is widened; and (4) providing a related information display apparatus employing such a method.

These and other advantages of the present invention will become apparent to those skilled in the art upon reading and understanding the following detailed description with reference to the accompanying figures.

BRIEF DESCRIPTION OF THE DRAWINGS

FIGS. 7A to 7C are views describing the retrieval of related word information under the condition of restricting the relationship between the size of the related word information display region and the relation level range, respectively showing the processings when the operation for widening the relation level range is input, the processings when the operation for narrowing the relation level range is input, and the processings when the operation for shifting the relation level range is input.

FIG. 13 is a view for describing a "method for retrieving related information" at step S704 in FIG. 11, showing the case of retrieving related information from an English-Japanese dictionary database.

FIG. 14 is a view for describing another "method for retrieving related information" at step S704 in FIG. 11, showing the case of retrieving related information from the coordinates on a map.

FIG. 15 is a view for describing still another "method for retrieving related information" at step S704 in FIG. 11, showing the case of retrieving related information from the place/building name.

FIG. 16 is a view for describing still another "method for retrieving related information" at step S704 in FIG. 11, showing the case of retrieving a help message from the operation on the display screen.

DESCRIPTION OF THE PREFERRED EMBODIMENTS

The present invention will be described by way of examples with reference to the accompanying drawings.

EXAMPLE 1

Figure 1A:
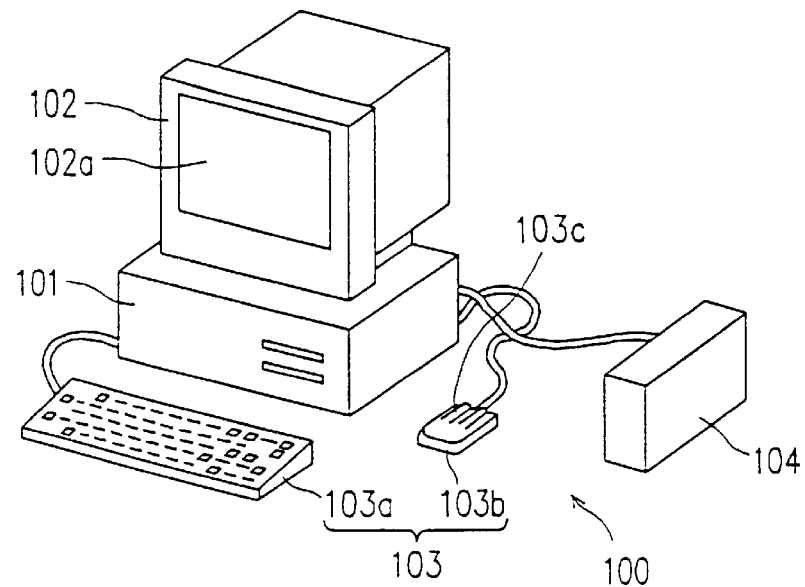
FIG. 1A is a perspective view showing the appearance of an information processing apparatus of Example 1 according to the present invention.

An information processing apparatus provided with a related word information retrieval function according to the present invention will be described as Example 1 with reference to FIGS. 1A and 1B. FIG. 1A is a perspective view illustrating an exemplified structure of the information processing apparatus of Example 1, and FIG. 1B is a block diagram thereof.

Referring to FIG. 1A, an information processing apparatus 100 of this example includes a processor 101 which conducts various types of operations, a display 102 having an image display screen 102a for displaying information, an input device 103 for inputting information into the processor 101, and a hard disk device 104 for storing the information. The input device 103 may include a keyboard 103a and a mouse 103b. The mouse 103b has at least one button 103c.

Figure 1B:
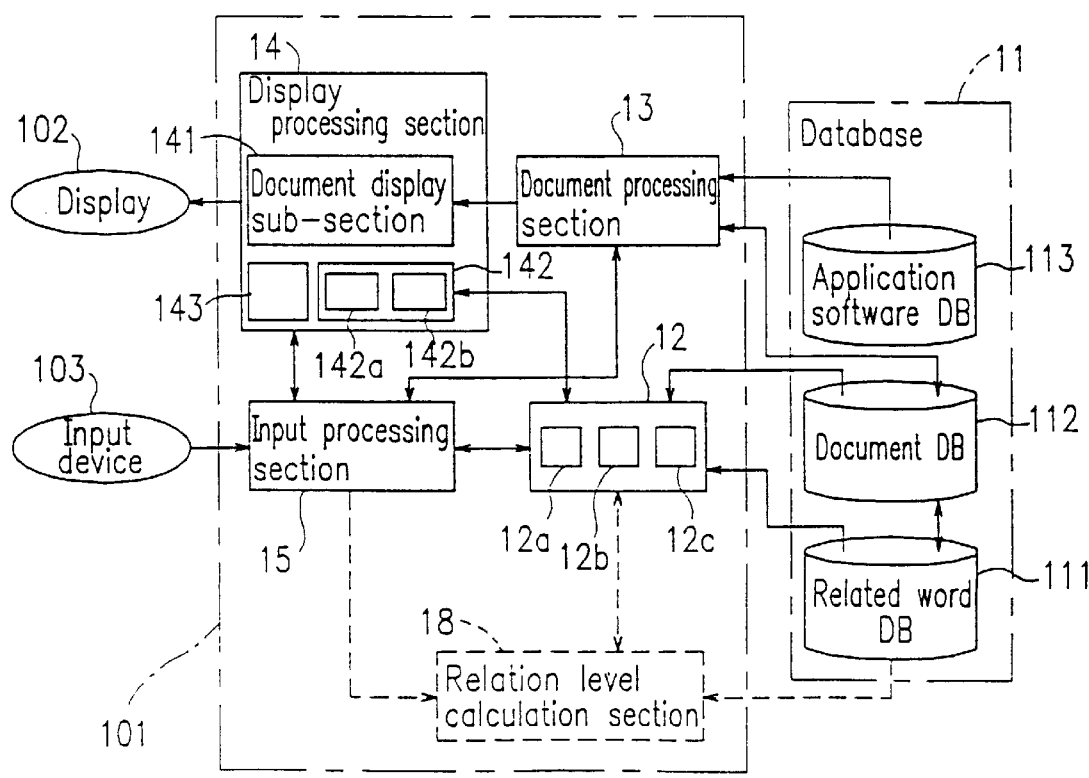
FIG. 1B is a block diagram of the information processing apparatus of FIG. 1A.

Referring to FIG. 1B, the processor 101 includes a related word information determining section 12 for determining a related word of a word received via the input device 103, a document processing section 13 for making a document, a display processing section 14 for processing data to be displayed on the display 102, and an input processing section 15 for processing input information.

The hard disk device 104 includes a database section 11. The database section 11 includes a related word database 111, a document database 112, and an application software database 113. The related word database 111 stores a plurality of words and their respective relation levels with other words. The "relation level" between two words as used herein means a value obtained by evaluating the relationship between the two words.

The document database 112 stores document information made and edited by the user and the like and document information related to the respective words. The "document information related to a word" as used herein includes a document where the word appears, a document describing the meaning of the word, a document associated with the word, and a document having any other relation with the word.

The application software database 113 stores an application software for editing documents stored in the document database 112 and new documents, an application software for displaying documents stored in the document database 112 and new documents, and an application software for storing information in the document database 112.

The related word database 111 forms a network of words linked according to the respective relation levels. In other words, the relationship between a word and another word is shown in the related word database 111 with respect to the relation level. More specifically, each relation level of each word with another word is directly stored in the related word database 111 as its related information, while document information related to each word is stored in the document database 112. The related word database 111 further stores, for each word, a pointer to the document information related to the word to indicate the corresponding relationship between each word and the related document information related to the word.

The relation level may be stored in the related word database 111 as a predetermined value. Alternatively, the related word database 111 may store a vector space defined by a word-related parameter, a parameter related to the relation level between words, and a parameter related to the word-related document information. Based on the relationship between the position of an input word and the vector space, the relation level between the input word and a word already stored in the related word database 111 may be determined. From the thus-determined relation level, a word related to the input word or document information related to the input word may be obtained.

In order to obtain the above-described relation level, the apparatus of this example may include a relation level calculation section 18 shown by the dash line in FIG. 1B. The relation level calculation section 18 determines where a word input by the user is located in the above vector space, and calculates the relation level between the input word and a word stored in the related word database 111 based on the determined position.

The related word information determining section 12 includes a relation level range setting sub-section 12a and a display information determining sub-section 12b.

The relation level range setting sub-section 12a sets the range of the relation level between the input word and a word related to the input word based on a signal supplied from the input device 103. The range of the relation level means, for example, the range of the relation level of information to be displayed as represented by values 321*b* and 322*b* in FIG. 3A.

The display information determining sub-section 12*b* determines the size, i.e., the area of a related word information display region with respect to the display screen 102*a*. It also determines the type of related words to be displayed on the related word information display region and the information amount of each related word depending on the relation level range set by the relation level range setting sub-section 12*a*. The related word information displaying region is a region of the display screen where related words and document information related to the related words are displayed. The type of related words means the content of the display on the display screen which may include only a heading word or include a heading word together with its meaning, for example, depending on the size of the display region and the number of items to be displayed, as will be exemplified in the examples. The information amount of the related words means the amount of information on the meaning of the related word to be displayed, represented by the number of characters. This is used to determine the occupation of a related word displayed in the entire display region. When the related word includes an image and the image is to be displayed, the size of the image is included in the information amount.

When a related word displayed on the related word information displaying region is selected via the input device 103, the display information determining sub-section 12*b* changes the information amount of the selected related word depending on the degree of selection. In other words, the information amounts of the related words displayed on the related word information display region change. The degree of selection means the number of related words included in the relation range to be displayed. When the number of related words is smaller, the degree of selection is higher. When the number of related words is larger, the degree of selection is lower.

Also, when information related to a word displayed on the related word information display region, i.e., related document information displayed thereon, is selected via the input device 103, the display information determining sub-section 12*b* changes the amount of the selected document information depending on the degree of selection.

The document processing section 13 aids in document editing by the user and/or processes the input of a reference, such as dictionary reference, based on a program of the application software stored in the application software database 113.

The display processing section 14 includes a document display sub-section 141, a related word information display sub-section 142, and a layout sub-section 143. The document display sub-section 141 makes a display layout, and the like, for the document edited by the document processing section 13, based on a display form of the application software stored in the application software database 113. The related word information display sub-section 142 makes a word information window 3 (see FIG. 2) for displaying related words of an input word and document information related to the input word. The layout sub-section 143 makes an overall display layout based on the respective display layouts made by the document display sub-section 141. The resultant overall display layout is sent to the display 102.

The related word information display sub-section 142 includes a display region setting portion 142*a* and a display control portion 142*b*. The display region setting portion 142*a* sets the size, i.e., the area of the related word information display region for displaying related words based on an input signal received from the input device 103. The display control portion 142*b* forms the related word information display region with the set size setting region and a relation level range setting region for setting the relation level range on the display screen 102*a*.

When all related words related to an input word can always be displayed within the related word information display region at one time, it is not necessary for the display control portion 142*b* to form the relation level range setting region on the display screen. In other words, when all related words stored in the related word database 111 and related to the input word can be displayed within the related word information display region at one time, the display control portion 142*b* can set the relation level range.

The related word information determining section 12 further includes a control sub-section 12*c* for controlling the display region setting portion 142*a* and the relation level range setting sub-section 12*a*. The control sub-section 12*c* controls the size setting of the related word information display region by the display region setting portion 142*a*, and the setting of the relation level range by the relation level range setting sub-section 12*a*, so that they satisfy predetermined conditions.

The input processing section 15 detects whether the type the input information received via the input device 103 is document editing, word input, or operation of the related word information window. When it is document editing, the input processing section 15 supplies the input information to the document processing section 13. When it is word input, the input processing section 15 supplies the input information to the related word information determining section 12. When it is the operation of the related word information window, the input processing section 15 supplies the input information to the display processing section 14.

Figure 2:
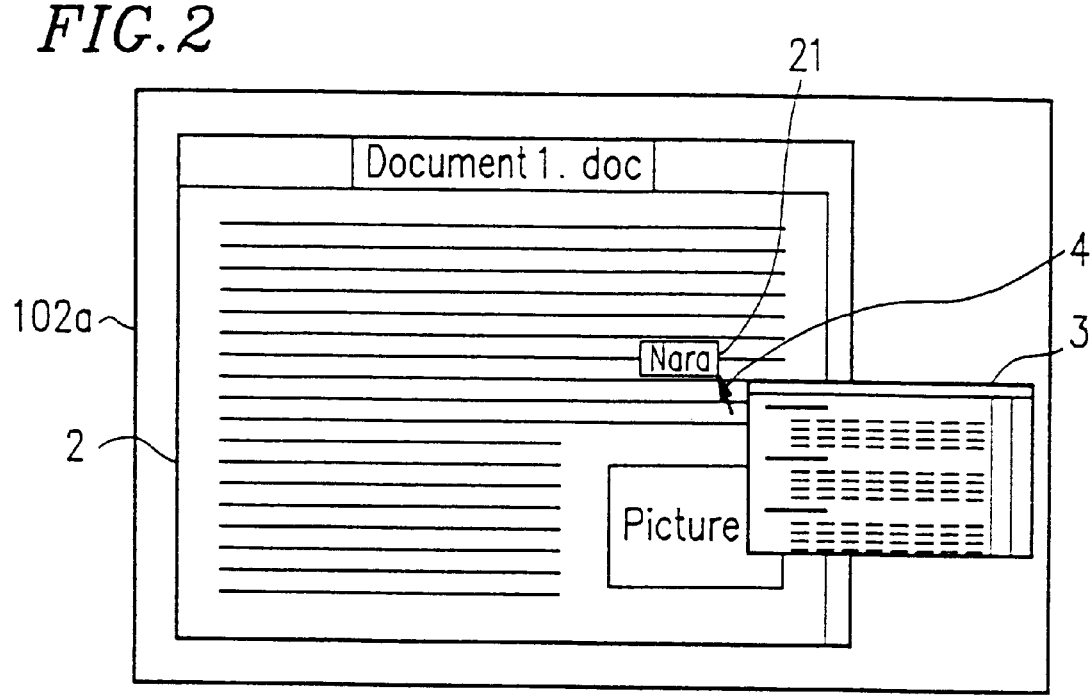
FIG. 2 shows an example of the layout of a display screen of the information processing apparatus of Example 1.

FIG. 2 shows an example of the layout of the display screen 102*a* of the display 102. Referring to FIG. 2, the display layout includes a document display region 2, a related word information window 3, and a mouse cursor 4 operated via an input device such as a mouse.

In Example 1, a word appearing on the document display region 2 is selected by use of the mouse cursor 4, and the like, and input into the input processing section 15. Then, when the input word is supplied to the related word information display sub-section 142, the related word information window 3 is opened on the display screen, displaying therein related words and document information related to the selected word. Alternatively, the related word information window 3 may be opened in such a manner that a word selected by the user by use of the mouse cursor 4, and the like, is enlarged in a predetermined zooming operation, and the related word information window 3 is opened at the position where the word i s being zoomed.

Figure 3A:
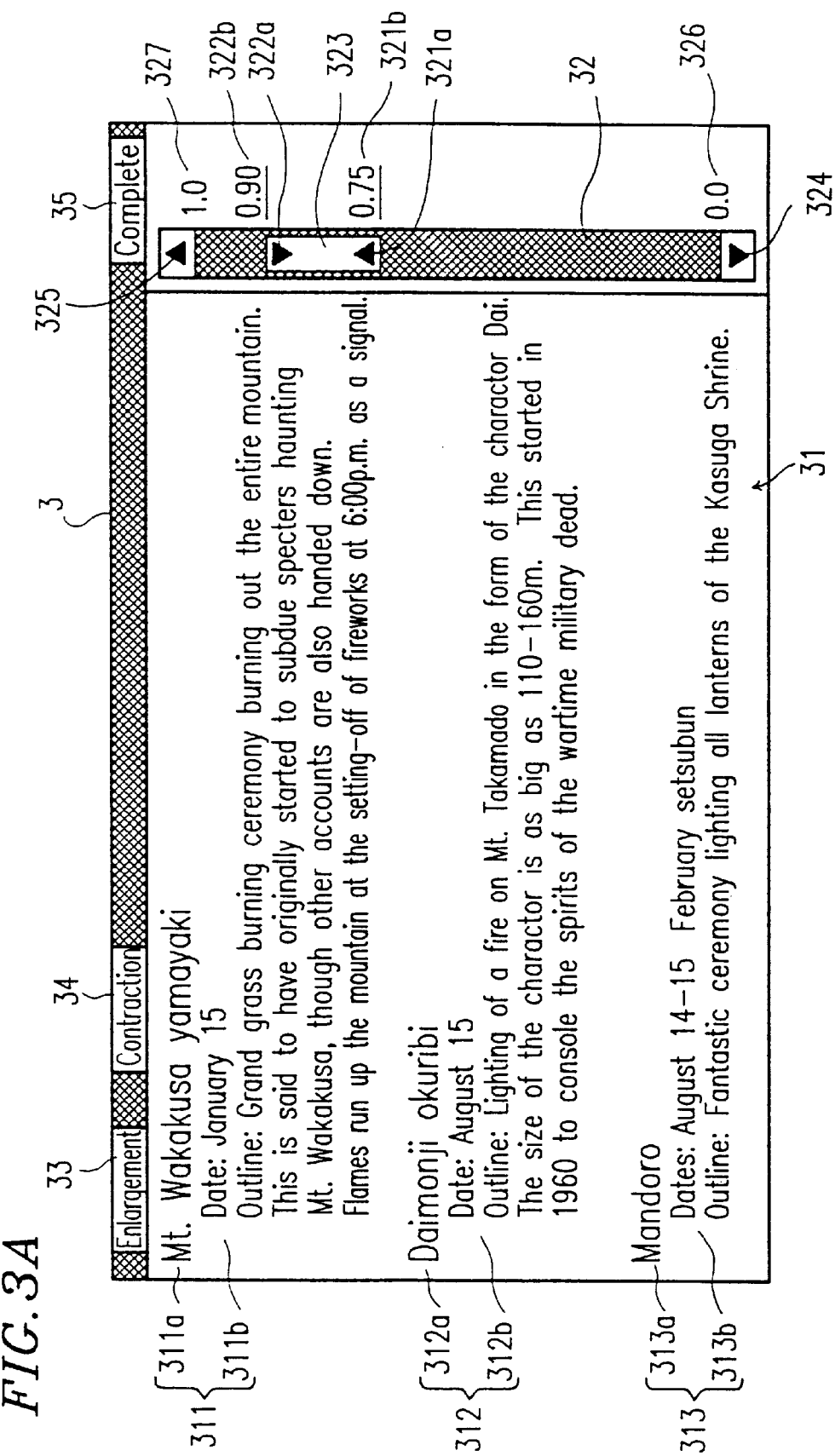
FIGS. 3A to 3C are examples of a related word information window displayed on the display screen of the information processing apparatus of Example 1, showing the display states when the relation level ranges are "0.75 to 0.90", "0.75 to 1.00", and "0.92 to 1.00", respectively.

FIG. 3A shows an example of the related word information window 3. Related words and document information related to the respective related words are displayed on a related word information display region 31. A relation level range setting region 32 includes a relation level range input portion for the input of the relation level range by use of the mouse cursor, and the like. The related word information window 3 further includes an enlargement button 33 for consecutively enlarging the related word information window 3, a contraction button 34 for consecutively contracting the related word information window 3, a completion button 35 for erasing the related word information window 3 from the display screen 102a.

The relation level range input portion (relation level range setting region) 32 can be of any form. In this example, a slider is used as will be described below.

In the slider system of this example, the relation level range can be set by shifting a minimum knob 321a for setting a minimum value and a maximum knob 322a for setting a maximum value formed respectively at the ends of a relation level range display portion 323. Alternatively, relation level range sliding buttons 324 and 325 may be used to shift both the minimum knob 321a and the maximum knob 322a by a predetermined amount in the respective indicated directions. This makes it possible to shift the relation level range display portion 323 without changing the width of the relation level range. A function of directly shifting the relation level range display portion 323 by the mouse cursor, and the like, may additionally be implemented.

The slider (relation level range input portion) 32 shows a minimum value 321b indicating the minimum value of the relation level range (position of the minimum knob 321a in the scale of the slider), a maximum value 322b indicating the maximum value of the relation level range (position of the maximum knob 322a in the scale of the slider), a minimum scale value 326 indicating the minimum scale value of the slider, and a maximum scale value 327 indicating the maximum scale value of the slider.

The enlargement button 33 and the contraction button 34 respectively enlarge/contract the related word information window 3 by a predetermined amount as long as the user continues to press these buttons. With this enlargement/contraction of the related word information window 3, the related word information display region 31 enlarges/contracts. In this example, the slider of the relation level range input portion 32 also enlarges/contracts in proportion to the enlargement/contraction ratio of the related word information window 3.

One of the features of this example is that related words of an input word within the relation level range specified in the relation level range input portion 32 are displayed together with related information, the amounts of which are determined depending on the size of the related word information display region 31. The information presented to the user changes in real time as the user conducts input operation for enlarging/contracting the related word information window 3, setting the relation level range, and the like. Thus, the user can obtain desired information in real time, reducing repeated routine operations and the labor required to find desired information.

Hereinbelow, the basic concept of Example 1 will be described using display examples on the display screen shown in FIGS. 3A to 3C, 4A, 4B, 5A, and 5B. Specifically, the retrieval of related word information by the information processing apparatus 100 will be described with respect to the interaction of the apparatus with the user via the relation level range input portion 32, the enlargement button 33, and the contraction button 34 and the display of related word information.

FIG. 3A shows the display state in the related word information window 3 when the relation level range is set at the range of 0.75 to 0.90. In this example, "Nara" is used as an input word 21 (see FIG. 2), and three related words, "Mt. Wakakusa yamayaki", "Daimonji okuribi", and "Mandoro" are included in the above relation level range.

The related word information display region 31 of the related word information window 3 has at least one information display region. The related words of the input word are displayed in respective information display regions 311, 312, and 313 in such a manner that a related word with a higher relation level is displayed in the upper portion of the screen. Alternatively, a related word with a higher relation level may be displayed in the lower portion of the screen.

The information display regions 311, 312, and 313 include related word display portion 311a, 312a, and 313a for displaying the related words and document display portions 311b, 312b, and 313b for displaying documents related to the related words, respectively.

The sizes of the information display regions may be determined by equally dividing the screen for all the related words to be displayed, by dividing the screen based on the ratio of the information amounts possessed by the respective related words, or by dividing the screen depending on the relation level.

Figure 3B:
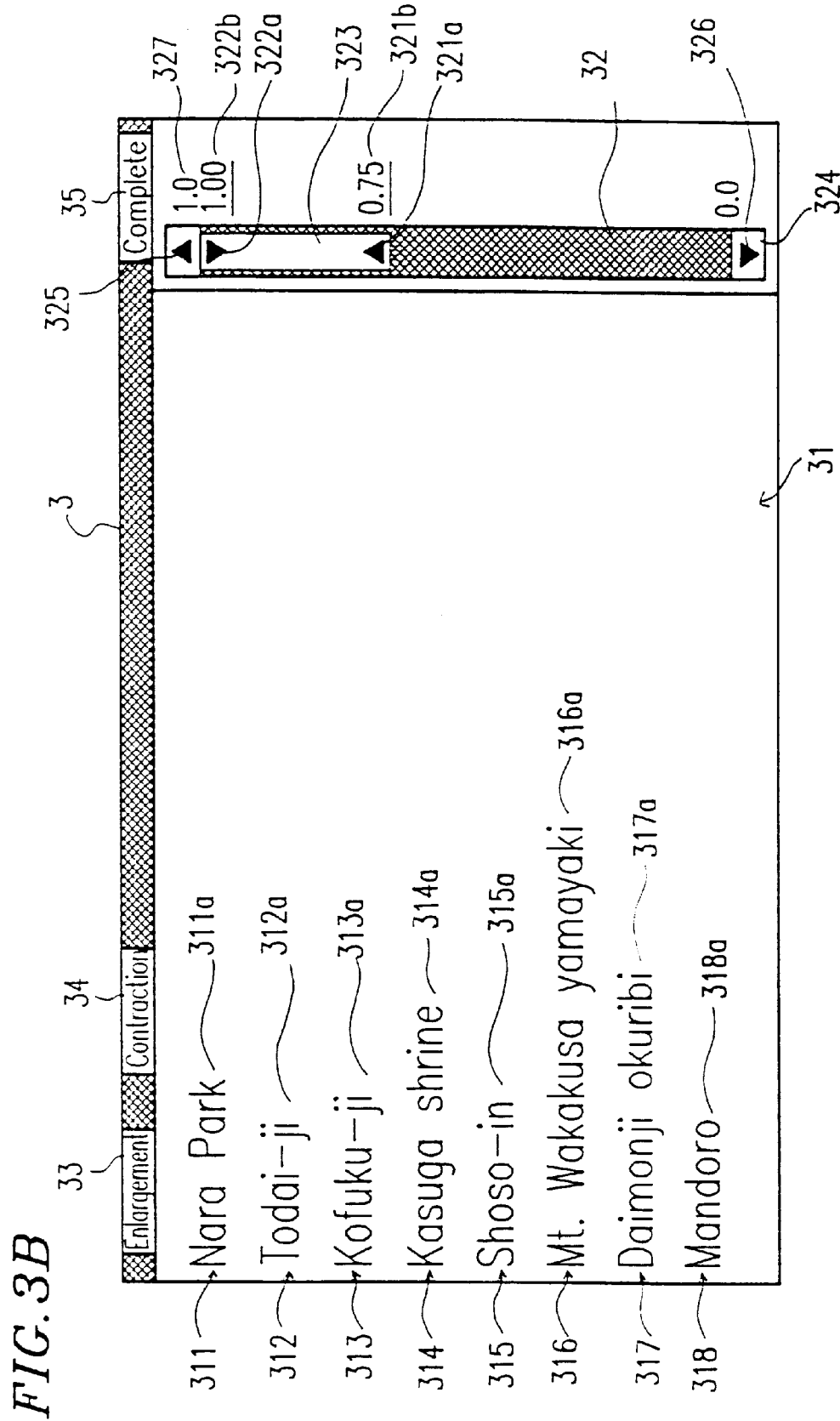

FIG. 3B shows the display state in the related word information window 3 obtained when the maximum knob 322a has been shifted to the maximum scale value by the mouse cursor 4 at the display state shown in FIG. 3A. The number of related words included in this relation level range increases to eight from three. This shift of the display state from the state shown in FIG. 3A to the state shown in FIG. 3B is conducted consecutively. That is, the relation level range is gradually widened, increasing the number of related words to be displayed, while reducing the size of the information display region of each related word. Finally, only the word display portions 311a to 318a occupy the respective information display regions 311 to 318 as shown in FIG. 3B.

Figure 3C:
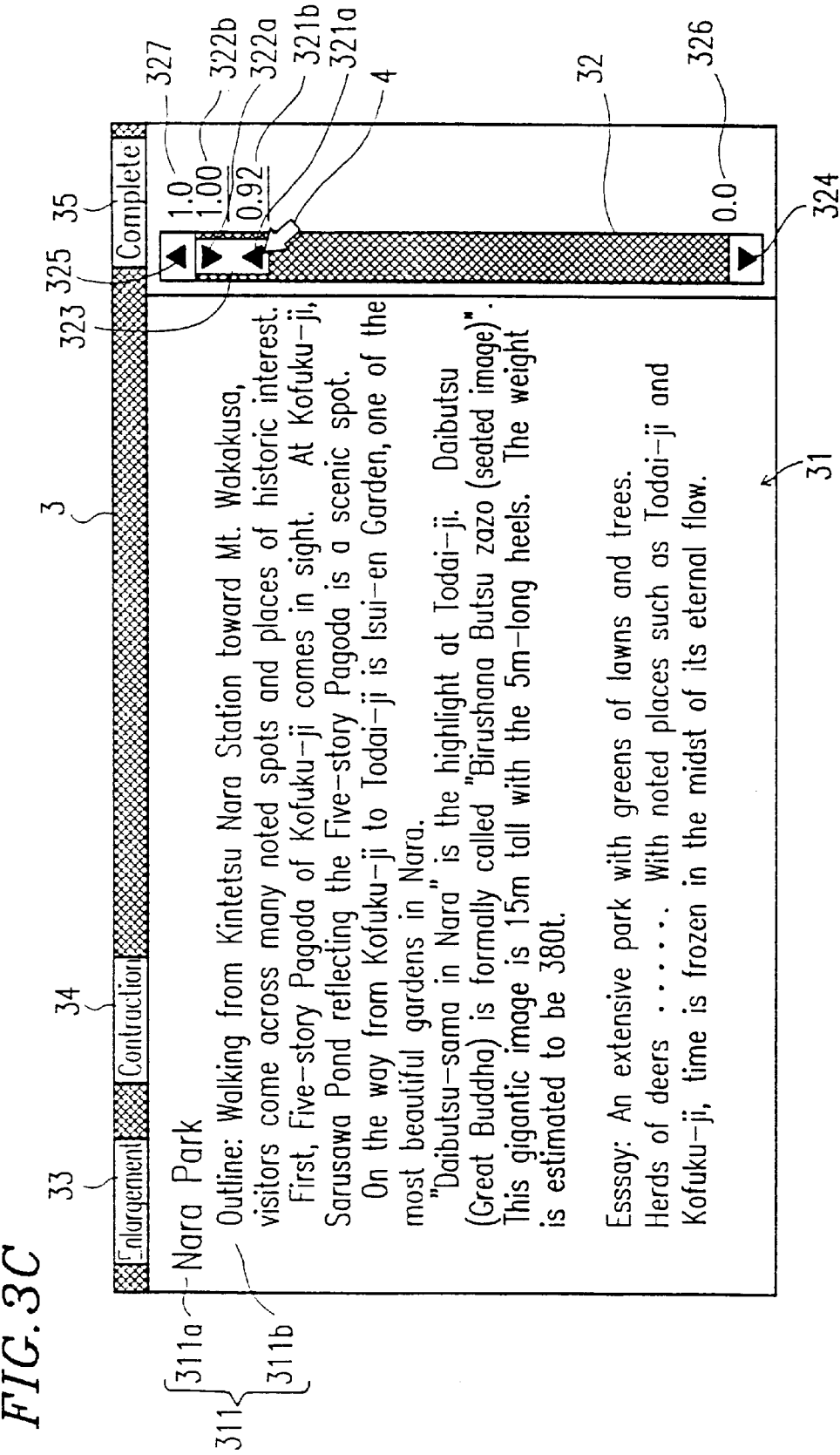

FIG. 3C shows the display state in the related word information window 3 obtained when the minimum knob 321a has been shifted upward at the display state shown in FIG. 3B until only one related word is displayed.

In the shift of the display state from the state shown in FIG. 3B to the state shown in FIG. 3C, the number of related words to be displayed gradually decreases, increasing the size of the document display portion 311b for displaying document information related to the related word to be displayed.

Figure 4A:
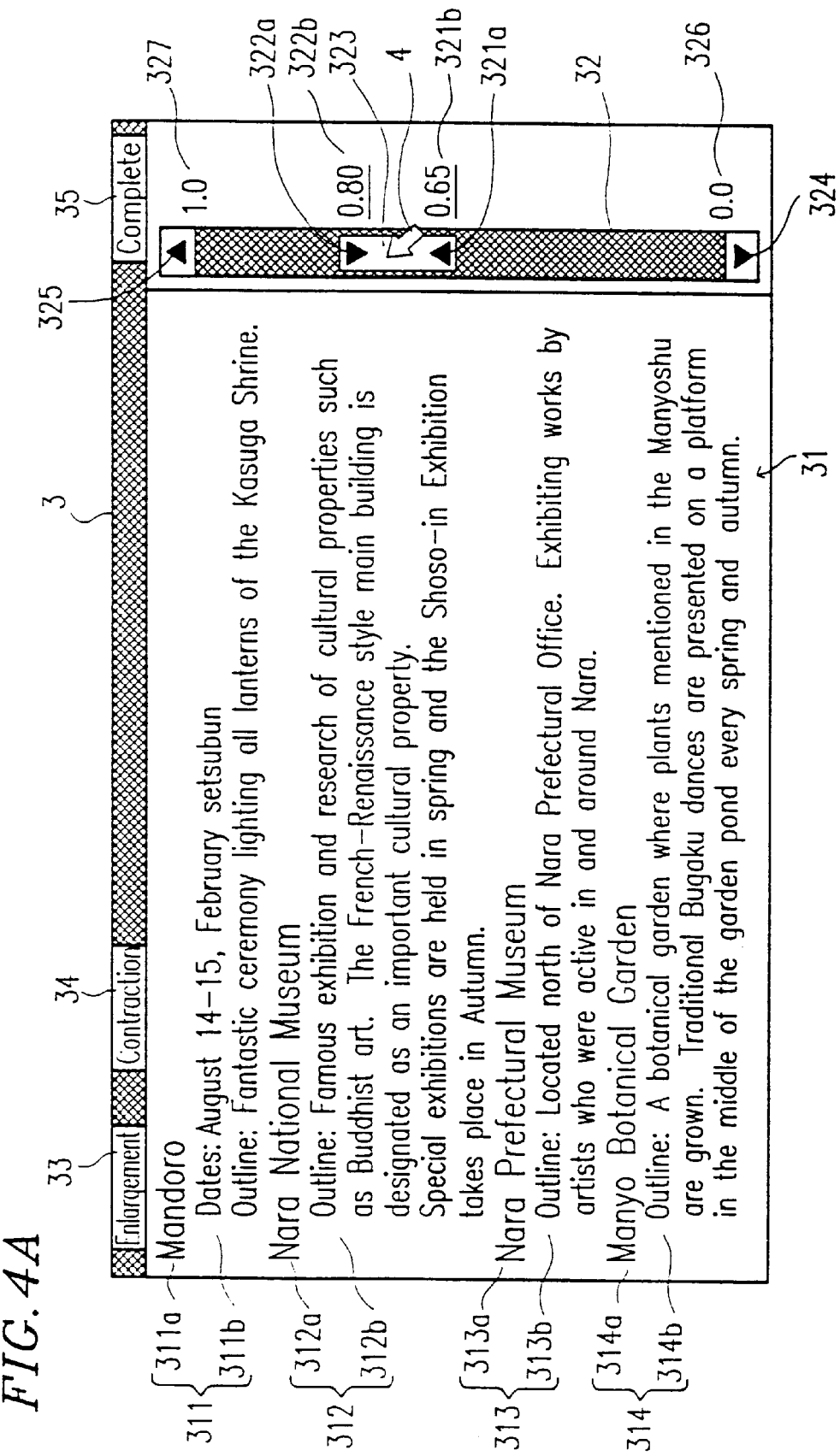
FIGS. 4A and 4B are examples of the related word information window displayed on the display screen of the information processing apparatus of Example 1, showing the display states when the relation level range is "0.65 to 0.80" for FIG. 4A, and when a related word "Nara National Museum" is selected at the display state in FIG. 4A for FIG. 4B.

FIG. 4A shows the display state in the related word information window 3 obtained when the relation level range display portion 323 has been shifted at the display state shown in FIG. 3A so that the relation level range is in the range of 0.65 to 0.80. In this case, while the width of the relation level range is unchanged, the number of related words included in this relation level range increases from three to four. With this increase in the number of related words, the amount of document information related to each related word reduces compared with that shown in FIG. 3A.

In the shift of the display state from the state shown in FIG. 3A to the state shown in FIG. 4A, the size of each information display region changes as the number of related words to be displayed changes.

Figure 4B:
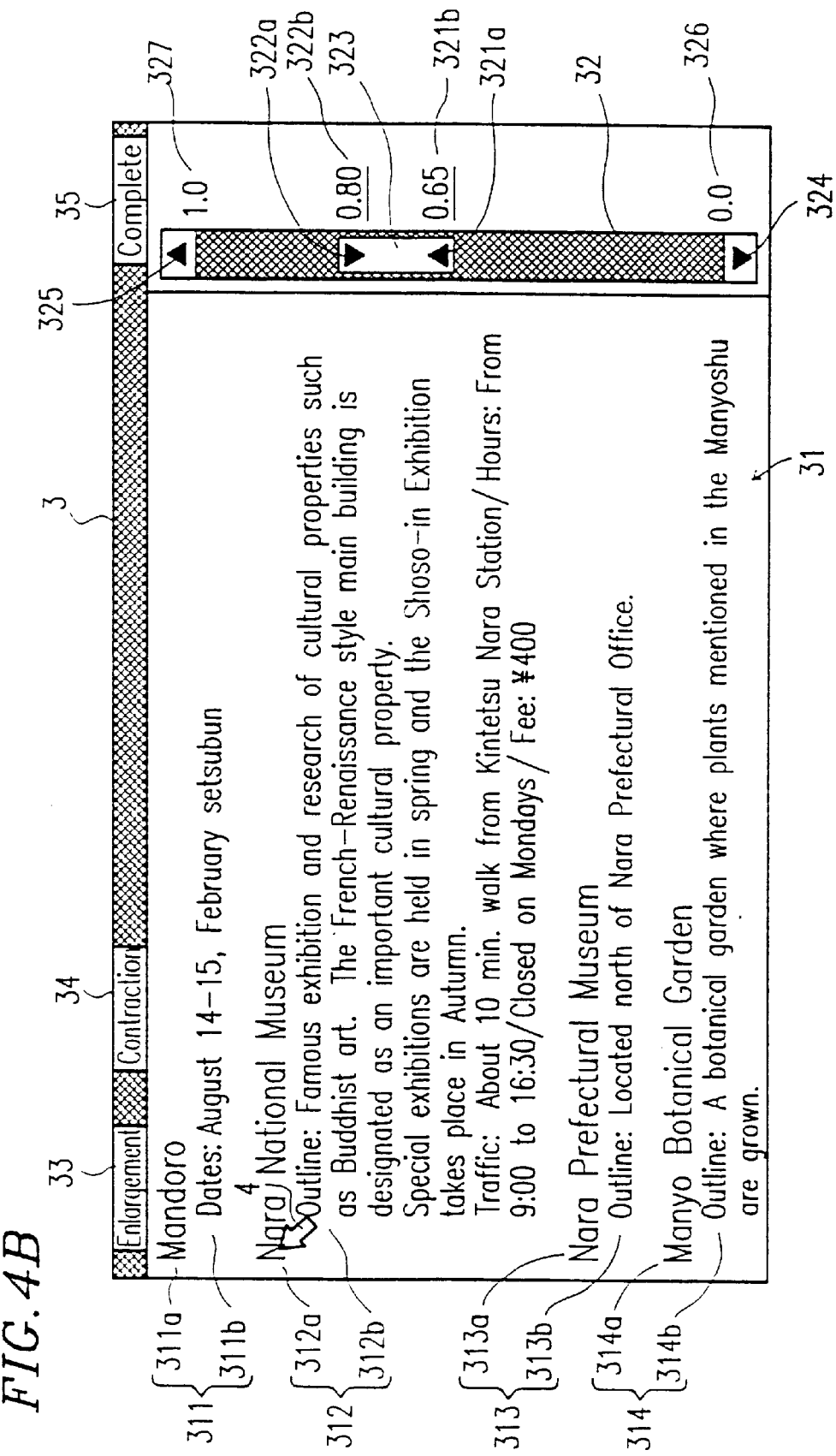

FIG. 4B shows the display state in the related word information window 3 obtained when the second item "Nara National Museum" has been selected at the state shown in FIG. 4A. For example, the selection of a certain item can be conducted by placing a mouse cursor within a desired information display region of the related word information display region 31, for example, the information display region 312, and pressing the mouse button.

The size of the document display portion 312b of the selected information display region 312 continues to increase at a predetermined rate during the period when the mouse button is being pressed. The sizes of the other document display portions 311b, 313b, and 314b decrease by the increase of the size of the document display portion 312b.

Figure 5A:
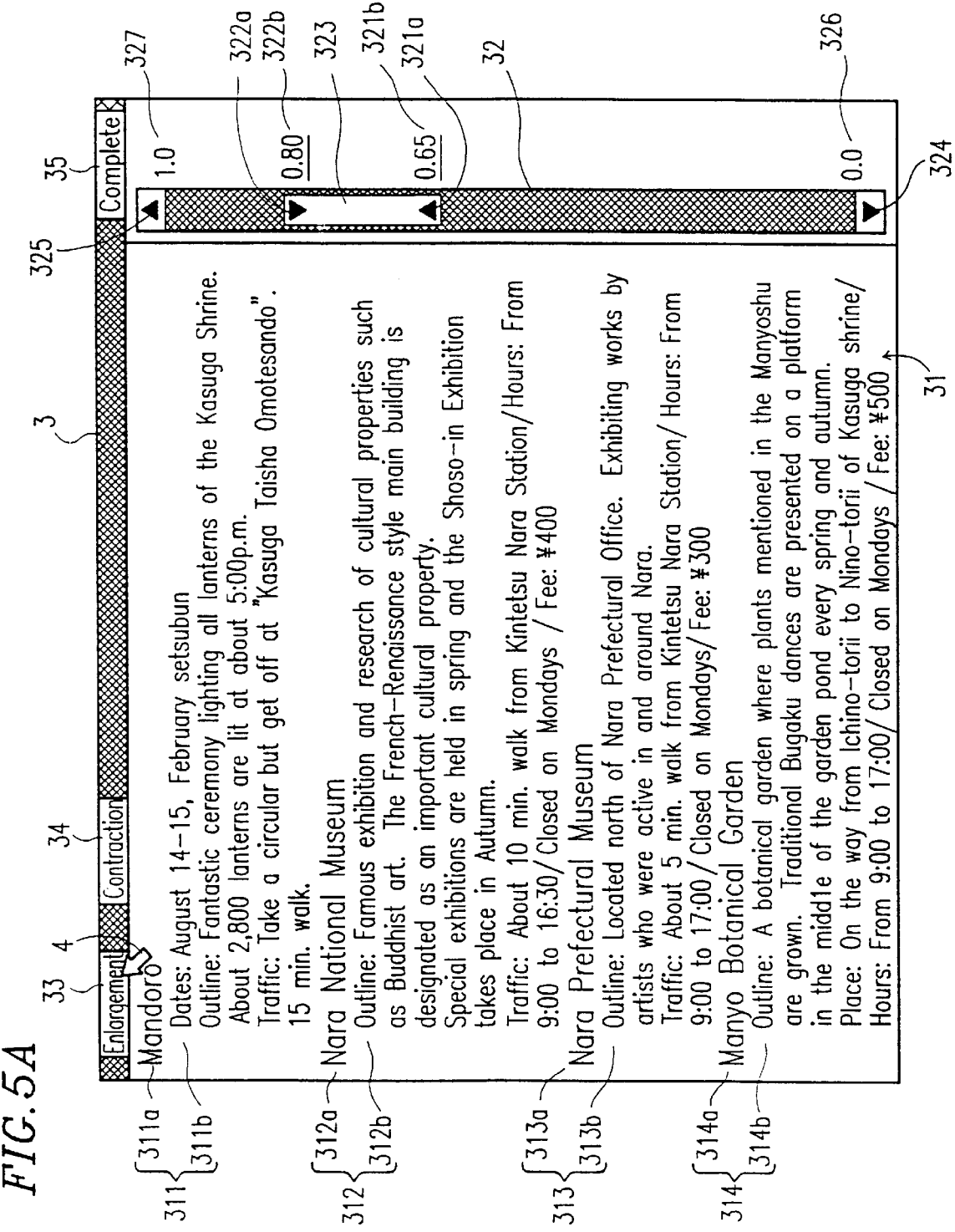
FIGS. 5A and 5B are examples of the related word information window displayed on the display screen of the information processing apparatus of Example 1, respectively showing the display states obtained when a related word information display region has been enlarged by pressing an enlargement button at the display state shown in FIG. 4B, and when the related word information display region has been contracted by pressing a contraction button at the display state shown in FIG. 4B.
Figure 5B:
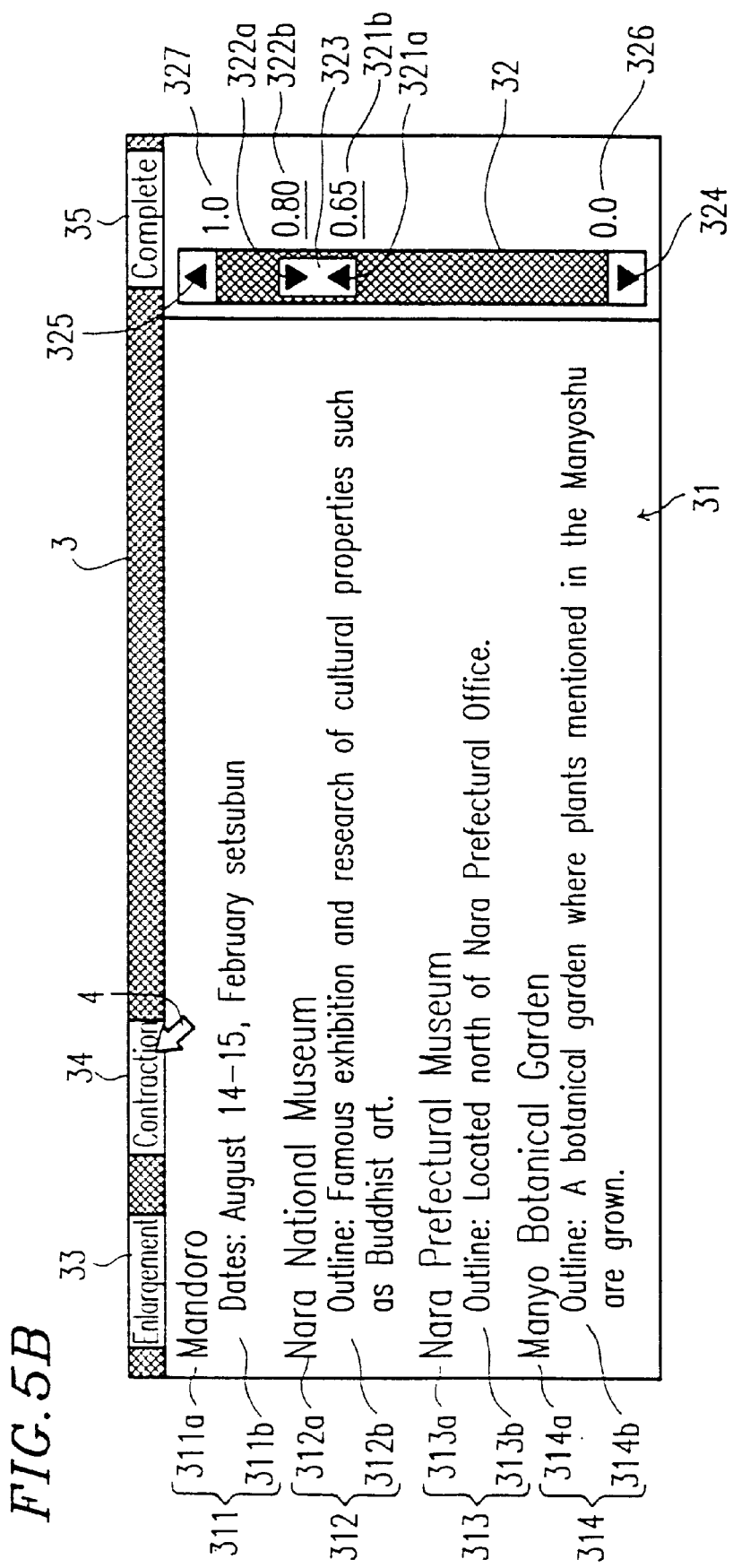

FIG. 5A shows the display state in the related word information window 3 obtained when the enlargement button 33 has been pressed via the mouse cursor at the state shown in FIG. 4B. FIG. 5B shows the display state in the related word information window 3 obtained when the contraction button 34 has been pressed via the mouse cursor at the state shown in FIG. 4B.

The related word information window 3 continues to enlarge during the period when the enlargement button 33 is being pressed. With this enlargement, the size of the related word information display region 31 increases. The enlargement ratio of the related word information display region 31 may be the same as that of the related word information window 3.

The related word information window 3 continues to contract during the period when the contraction button 34 is being pressed. With this contraction, the size of the related word information display region 31 decreases. The contraction ratio of the related word information display region 31 may be the same as that of the related word information window 3.

In this example, the relation level range does not change when the size of the related word information display region 31 changes. Accordingly, by continuing to press the enlargement button 33, the information display portions of the respective related words displayed gradually expand, allowing more detailed information to be provided. In contrast, by continuing to press the contraction button 34, the information display portions of the respective related words gradually contract, reducing the information amount displayed.

In this example, the relation level range is input by the user via the relation level range input portion 32, and the sizes of the regions where the related words included in the relation level range and document information related to the related words are displayed are changed with the change in the size of the related word information display region 31.

However, in some cases the number of related words included in the relation level range input via the relation level range input portion 32 may be different from the maximum number of related words which can be actually displayed on the related word information display region 31.

In this example, the above problem can be solved since the apparatus of this example operates to satisfy a basic conditional equation below for restricting the relationship between the size of the related word information display region 31 and the relation level range:

$$n_{dmax} \geq n_r$$

wherein $n_{dmax}$ denotes the maximum number of related words which can be displayed on the related word information display region 31, and $n_r$ denotes the number of related words which are included in the relation level range input via the relation level range input portion 32.

When the condition ">" is satisfied in the above conditional equation, at least part of document information related to the related words to be displayed are displayed on the related word information display region 31.

When the condition "=" is satisfied in the above conditional equation, no document information relating the related words to be displayed is displayed on the related word information display region 31. Only the related words are listed on the related word information display region 31.

The cases which require use of the above conditional equation are:

(1) when the contraction button 34 is pressed to contract the related word information display region 31;

(2) when the minimum knob 321a or the maximum knob 322a is shifted to widen the relation level range;

(3) when the minimum knob 321a or the maximum knob 322a is shifted to narrow the relation level range; and (4) when the relation level range is shifted or the relation level range sliding button 324 or 325 is pressed to shift the relation level range.

Further, the above conditional equation may be used in the following case. In the following case, it is better to use the conditional equation to provide a restriction between the size of the related word information display region 31 and the relation level range:

(5) when the enlargement button 33 is pressed to enlarge the related word information display region 31.

Hereinbelow, the operations under a restriction of being between the size of the related word information display region 31 and the relation level range in the above five cases will be described in detail with reference to FIGS. 6A, 6B, and 7A to 7C. The following processes are conducted under the condition where the control sub-section 12c controls the display region setting portion 142a and the relation level range setting sub-section 12a.

Figure 6A:
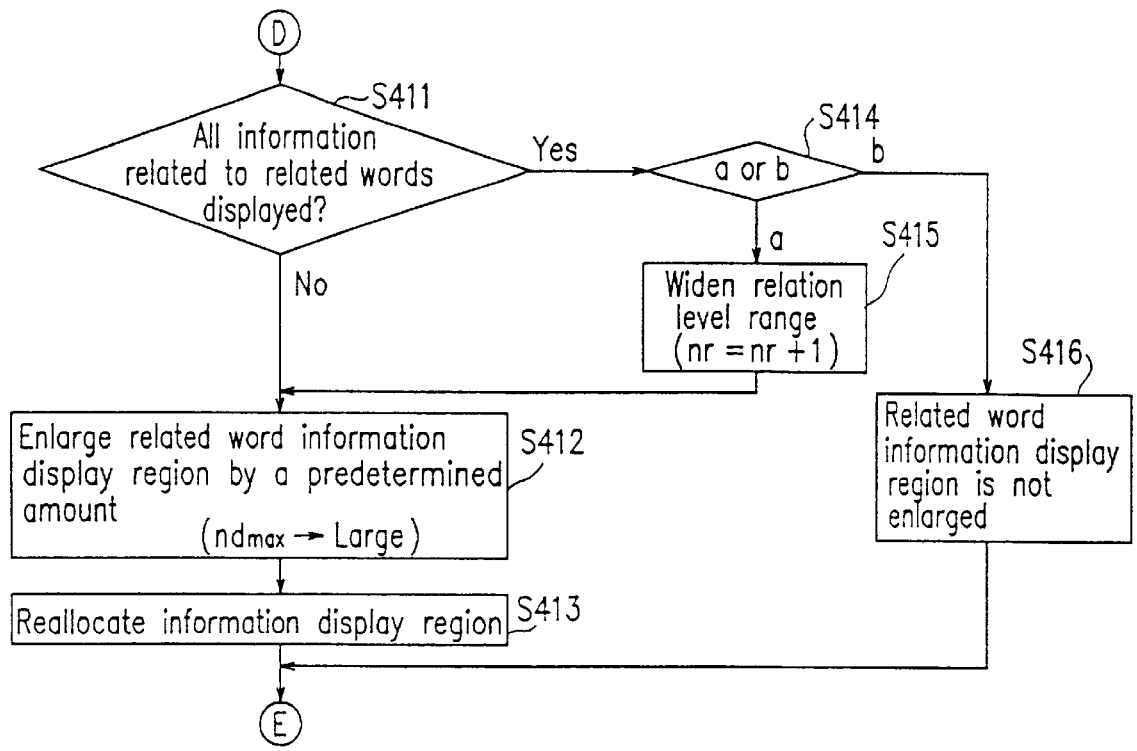
FIGS. 6A and 6B are views describing the retrieval of related word information under the condition of restricting the relationship between the size of the related word information display region and the relation level range, showing the processings when the operation for enlarging the related word information display region is input and the processings when the operation for contracting the related word information display region is input, respectively.

FIG. 6A is a flowchart of the processes when the operation for enlarging the related word information display region 31 is input. In this case, the above conditional equation has already been satisfied. At step S411, the control sub-section 12c judges whether or not all document information related to the related words to be displayed have been displayed. If all document information has not been displayed, the control sub-section 12c instructs the display region setting portion 142a to enlarge the related word information display region 31 by a predetermined amount at step S412. At step S413, the control sub-section 12c controls to reallocate the related word information display region 31 so that the amounts of document information related to the related words can be increased by the amount obtained by the enlargement of the display region. At this time, $n_{dmax}$ tends to increase.

When it is judged that all document information have been displayed at step S411, the process proceeds to step S414. The evaluation of the condition "a or b" at step S414 has been preset, and may be customized by the user. When the selection of "a" has been preset, the control sub-section 12c instructs the relation level range setting sub-section 12a to widen the relation level range to increase $n_r$ by one and to renew the display of the relation level range input portion 32 at step S415. Then, at steps S412 and S413, the control sub-section 12c instructs the display region setting portion 142a to display document information related to the additional related word.

When the selection of "b" has been preset at step S414, the control sub-section 12c neither instructs the display region setting portion 142a to enlarge the related word information display region 31, nor does it instruct the relation level range setting sub-section 12a to widen the relation level range (step S416).

Figure 6B:
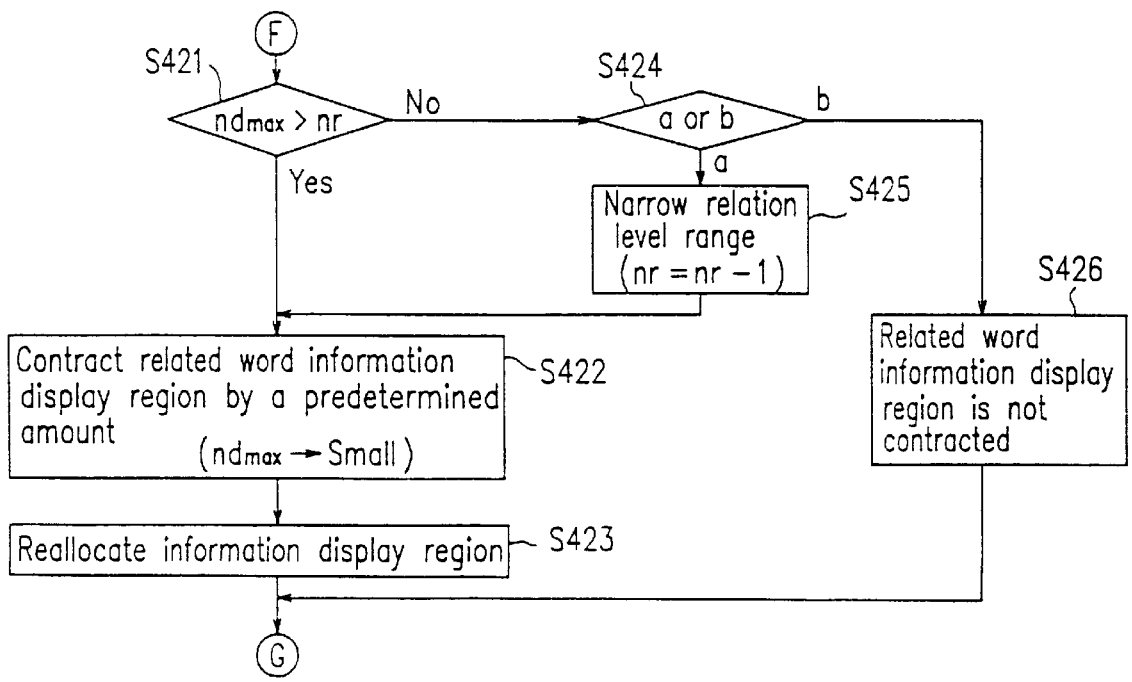

FIG. 6B is a flowchart of the processes when the operation for contracting the related word information display region 31 is input.

In this case, since $n_{dmax}$ decreases by the contraction, the control sub-section 12c evaluates $n_{dmax} > n_r$ at step S421. If the evaluation is "Yes", the control sub-section 12c instructs the display region setting portion 142a to contract the related word information display region 31 by a predetermined amount at step S422, and controls to reallocate the related word information display region 31 so that the amounts of document information of the related words displayed are decreased by the contraction amount at step S423. At this time, $n_{dmax}$ tends to decrease.

If the evaluation is "No" at step S421, the process proceeds to step S424. The evaluation of the condition "a or b" at step S424 has been preset, and may be customized by the user. When the selection of "a" has been preset, the control sub-section 12c instructs the relation level range setting sub-section 12a to narrow the relation level range to decrease $n_r$ by one and to renew the display of the relation level range input portion 32 at step S425. Then, at steps S422 and S423, the control sub-section 12c instructs the display region setting portion 142a to renew the display on the related word information display region 31.

When the selection of "b" has been preset at step S424, the control sub-section 12c neither instructs the display region setting portion 142a to contract the related word information display region 31, nor does it instruct the relation level range setting sub-section 12a to narrow the relation level range (step S426).

FIG. 7A is a flowchart of the processes when the operation for widening the relation level range is input.

The control sub-section 12c checks whether or not $n_r$ has increased at step S430. If not, no process is conducted.

If $n_r$ has increased, the control sub-section 12c evaluates $n_{dmax} > n_r$ at step S431. If "Yes", the control sub-section 12c instructs the display region setting portion 142a to reallocate the related word information display region 31 at step S433.

If the evaluation is "No" at step S431, the process proceeds to step S434. The evaluation of the condition "a or b" at step S434 has been preset, and may be customized by the user. When the selection of "a" has been preset, the control sub-section 12c instructs the display region setting portion 142a to enlarge the related word information display region 31 by one increment of $n_{dmax}$ at step S435, and controls to reallocate the related word information display region 31 at step S433.

When the selection of "b" has been preset at step S434, the control sub-section 12c controls so that the relation level range is not further widened at step S436. That is, the relation level range is restricted from widening by the operation of the minimum knob 321a or the maximum knob 322a.

FIG. 7B is a flowchart of the processes when the operation for narrowing the relation level range is input.

The control sub-section 12c checks whether or not $n_r$ has decreased at step S440. If not, no process is conducted.

If $n_r$ has decreased, the control sub-section 12c evaluates $n_{dmax} > n_r$ at step S441. If "Yes", the control sub-section 12c instructs the display region setting portion 142a to reallocate the related word information display region 31 at step S443.

If the evaluation is "No" at step S441, the process proceeds to step S444. The evaluation of the condition "a or b" at step S444 has been preset, and may be customized by the user. When the selection of "a" has been preset, the control sub-section 12c instructs the display region setting portion 142a to contract the related word information display region 31 by one decrement of $n_{dmax}$ at step S445, and controls to reallocate the related word information display region 31 at step S443.

When the selection of "b" has been preset at step S444, the control sub-section 12c controls so that the relation level range is not further narrowed at step S446. That is, the relation level range is restricted from narrowing by the operation of the minimum knob 321a or the maximum knob 322a.

FIG. 7C is a flowchart of the processes when the operation for shifting the relation level range is input.

The control sub-section 12c checks whether $n_r$ has increased or decreased at step S450. If the relation level range has been widened, the control sub-section 12c conducts the processes shown in FIG. 7A to be followed when $n_r$ has increased at step S452. If the relation level range has been narrowed, the control sub-section 12c conducts the processes shown in FIG. 7B to be followed when $n_r$ has decreased at step S451. If the relation level range has been neither widened nor narrowed, the control sub-section 12c conducts no process.

The process at step S450 overlap the processing at step S430 in FIG. 7A or the processing at step S440 in FIG. 7B. These processes should therefore be integrated at an implementation of the apparatus.

In the case where many related words are included in a narrow relation level range, a delicate range setting may not be possible with the slider of the relation level range input portion 32 due to the resolution of the display 102. As a result, detailed information may not be obtained.

In consideration of the above case, the keyboard is preferably used, in addition to the slider, to directly input the relation level range. When only the slider is used, however, the minimum scale value 326 and the maximum scale value 327 can be fixed to narrow the scale width.

Figure 8:
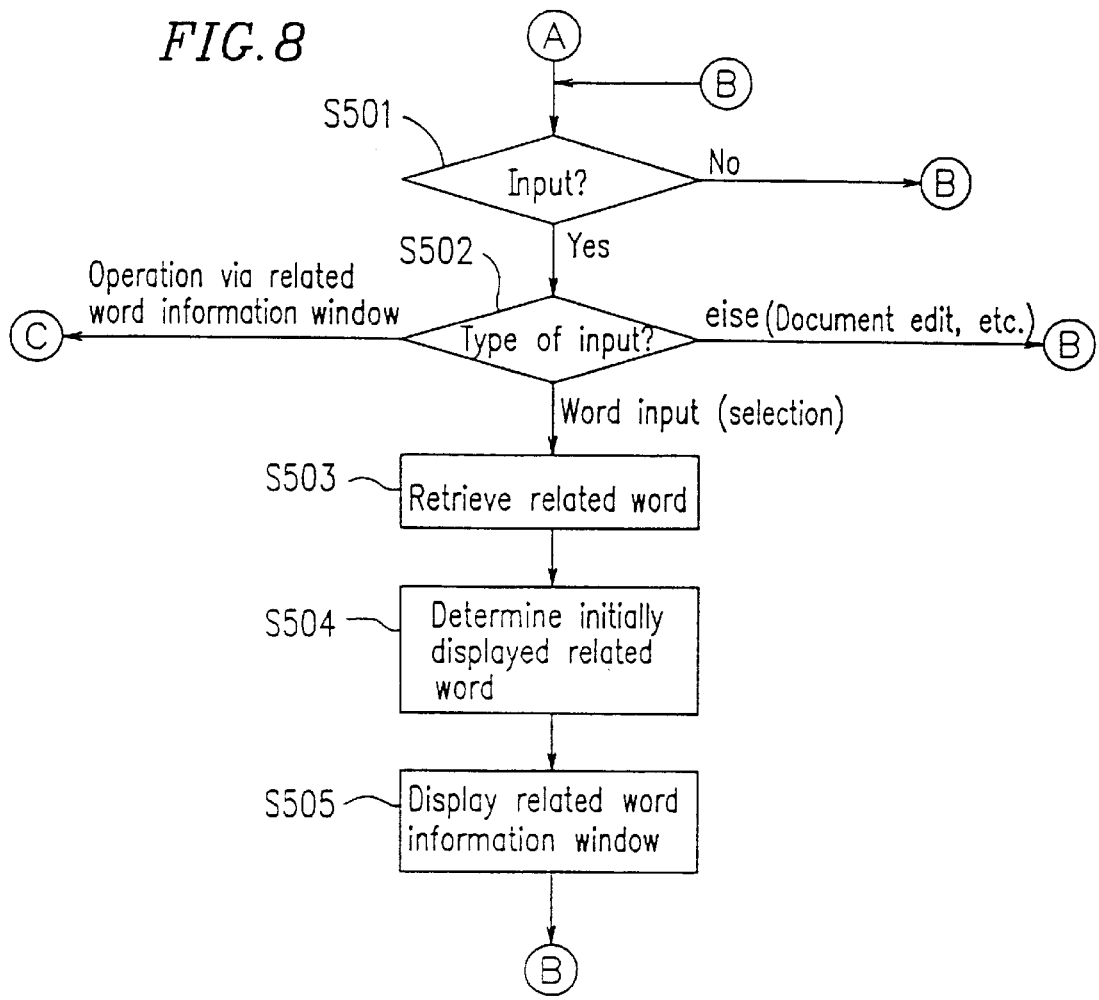
FIG. 8 is a main flowchart of operation algorithms in the information processing apparatus of Example 1.
Figure 9:
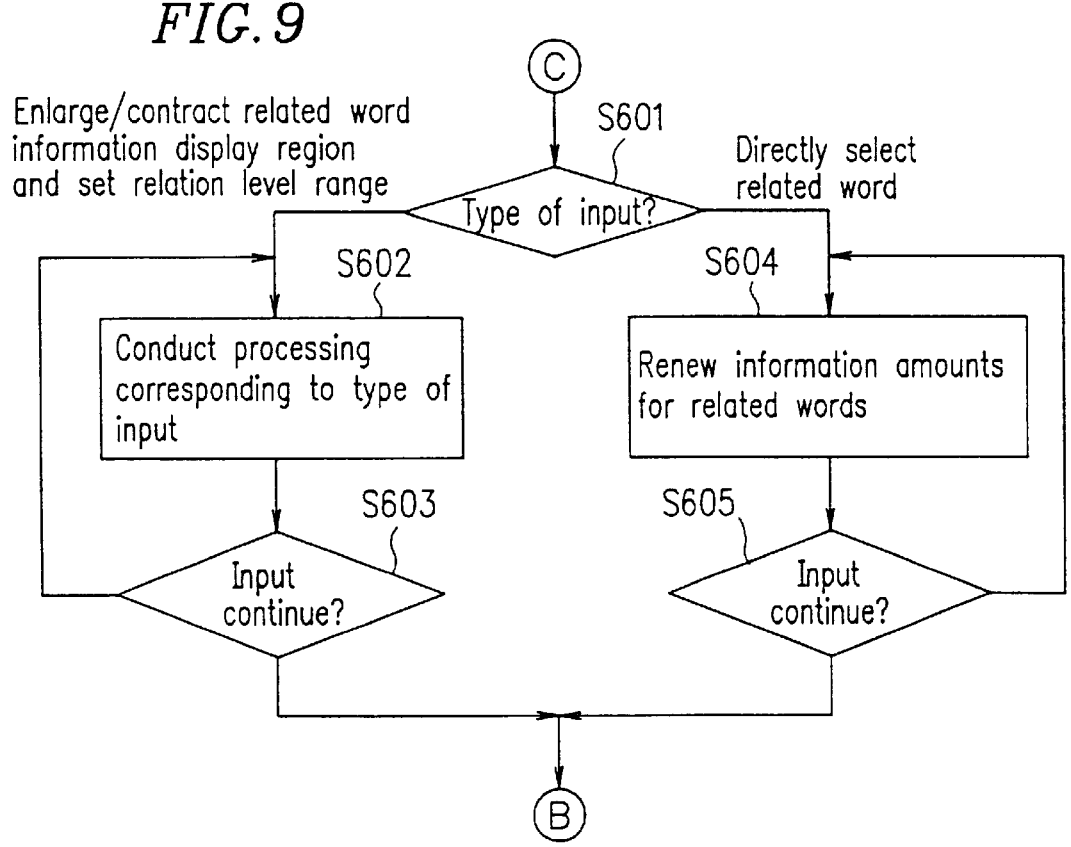
FIG. 9 is a flowchart of the operation of the information processing apparatus of Example 1 when an input is received via the related word information window.

Now, the overall operation of the information processing apparatus of this example will be described with reference to FIGS. 8 and 9. FIG. 8 and 9 are flowcharts of algorithms used in the information processing apparatus of this example.

First, at step S501, the input processing section 15 judges whether or not the input device 103 have received an input. The input processing section 15 repeats step S501 until an input is received. Upon receipt of an input, the process proceeds to step S502.

At step S502, the input processing section 15 identifies the type of the input. If the input is via the related word information window 3, the process proceeds to the C node, where the processes shown in FIG. 9 are conducted by the control sub-section 12c. If the input is a word input, the display information determining sub-section 12b conducts the processing described below at step S503. If an input other than the above is received, the process returns to step S501 where the processing by the input processing section 15 is conducted.

At step S503, the display information determining sub-section 12b retrieves related words of the input word from the related word database 111. If the apparatus is provided with the relation level calculation section 18, the relation level calculation section 18 calculates the relation level between the input word and each related word retrieved from the related word database 111 with reference to the information stored in the related word database 111 at step S503.

Next, at step S504, the display information determining sub-section 12b determines the related words to be initially displayed from the retrieved related words in consideration of the initial size of the related word information display region 31 and the initial relation level range. For example, only the maximum number of related words which can be displayed on the initial related word information display region 31 may be displayed in such a manner that a related word with a higher relation level is listed above.

At step S505, the related word information display sub-section 142 displays the related word information window 3. Then, the process returns to step S501.

Then, referring to FIG. 9, the case where an input is received via the related word information window 3 will be described.

At step S601, the input processing section 15 judges the type of the input via the related word information window 3. If the input relates to the enlargement or contraction of the related word information display region 31 or the setting of the relation level range, the process at step S602 is conducted. If the input relates to direct selection of a related word, the process at step S604 is conducted.

At step S602, the input processing section 15 judges which one of the aforementioned five input cases the input is. Depending on the judgment result, one of the series of processes shown in FIGS. 6A, 6B, and 7A to 7C are executed by the control sub-section 12c. Upon completion of the processes, the input processing section 15 judges whether or not the input continues. If it continues, the process at step S602 is repeated. If the input has been terminated, the process returns to step S501 in FIG. 8.

At step S604, the display information determining sub-section 12b enlarges the information display region of the selected related word to increase the amount of document information, while contracting the information display regions of the other related words displayed. At step S605, the control sub-section 12c judges whether or not the input of related word selection continues. If it continues, the process at step S604 is repeated. If the input has been terminated, the process returns to step S501 in FIG. 8.

In this example, the user selects a word in a document displayed on the screen for editing as the initial word input. The initial word may also be input via an exclusive word input portion displayed on the display screen.

In this example, a GUI component is used for the input via the related word information window 3. Alternatively, the input device may be used for inputting the operations such as the enlargement and contraction of the related word information window 3 by allocating the operations to respective keys, for example, of the input device.

In this example, texts are used as the document information. Graphic data or multimedia data combining texts and graphics may also be used.

EXAMPLE 2

Figure 10:
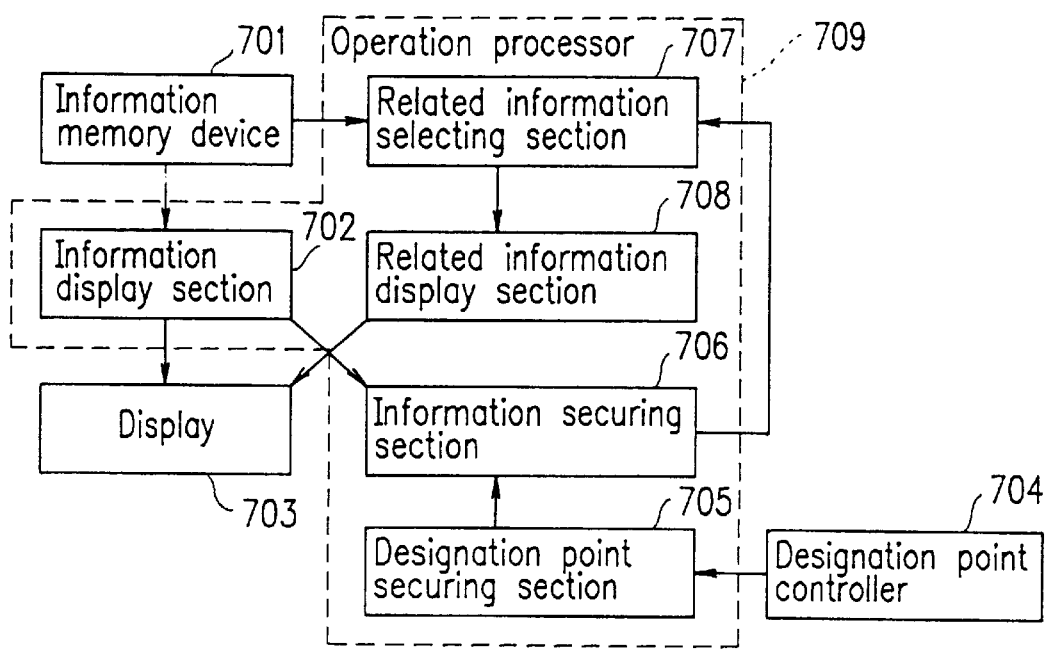
FIG. 10 is a block diagram of a related information display apparatus of Example 2 according to the present invention.

A first example of the related information display apparatus according to the present invention will be described as Example 2. FIG. 10 is a block diagram of the related information display apparatus of this example.

Referring to FIG. 10, the related information display apparatus of this example includes an information memory device 701, a display 703, a designation point controller 704, and an operation processor 709. The operation processor 709 includes an information display section 702, a designation point securing section 705, an information securing section 706, a related information selecting section 707, and a related information display section 708.

The information memory device 701 stores a plurality of types of information such as reference information referred to by the user; specific related information such as memo information linked to an information unit located at a position on a display screen designated by the user; and general information such as dictionary information, address information, map information, telephone number information, text information, and image information including motion pictures and photographs. The reference information means the information referred to by the user with respect to some information. The reference information may be the same as the related information.

The information display section 702, which is connected to the information memory device 701, produces a display content from the information stored in the information memory device 701.

The display 703, which is connected to the information display section 702, includes a frame buffer for storing the display content produced by the information display section 702 and a display screen for displaying the display content.

The designation point controller 704 controls a pointer which points to a position on the display screen. For example, the designation point controller 704 moves the point to the position on the display screen designated by the user. The designation point controller 704 can detect the position of the pointer on the display screen.

When map information is displayed on the display screen, the designation point controller 704 may control the pointer by assuming that a predetermined position, e.g., the center of the display screen, is the position designated by the user. Examples of the designation point controller 704 include pointing devices such as a cursor key of a keyboard, a mouse, a pointing pen, a digitizer, and a touch panel. The designation point controller 704 may also be designed to control the position of the pointer on the display screen based on the focal point of the users's eyes.

The designation point securing section 705, which is connected to the designation point controller 704, determines the coordinates of the point designated by the user, i.e., the coordinates of the position of the pointer on the display screen based on a signal supplied from the designation point controller 704.

The information securing section 706, which is connected to the designation point securing section 705 and the information display section 702 secures information, such as an icon, displayed at the position on the display screen corresponding to the coordinates determined by the designation point securing section 705.

The related information selecting section 707, which is connected to the information securing section 706 and the information memory device 701, retrieves information related to the information secured by the information securing section 706 from the information memory device 701 at one stage or multiple stages. The retrieval at one stage means to retrieve information directly associated with a word as, for example, "plural form of abacus" is retrieved from "abaci" shown in FIG. 13. The multiple stages means to retrieve required information via information associated with a word as, for example, the file named "Todaiji.rgb" is first retrieved from "Todai-ji" and then the image of Todai-ji is retrieved from the file "todaiji.rgb" as shown in FIG. 15.

The related information display section 708, which is connected to the related information selecting section 707, produces a display content to be displayed on the display screen of the display 703 from the related information retrieved by the related information selecting section 707, and displays the produced display content on a predetermined region of the display screen.

The operation processor 709 may have any other configuration so long as it controls the information memory device 701, the display 703, and the designation point controller 704. The operation processor 709 may also be composed of a memory storing a program and the like and a CPU operated according to the program.

Figure 11:
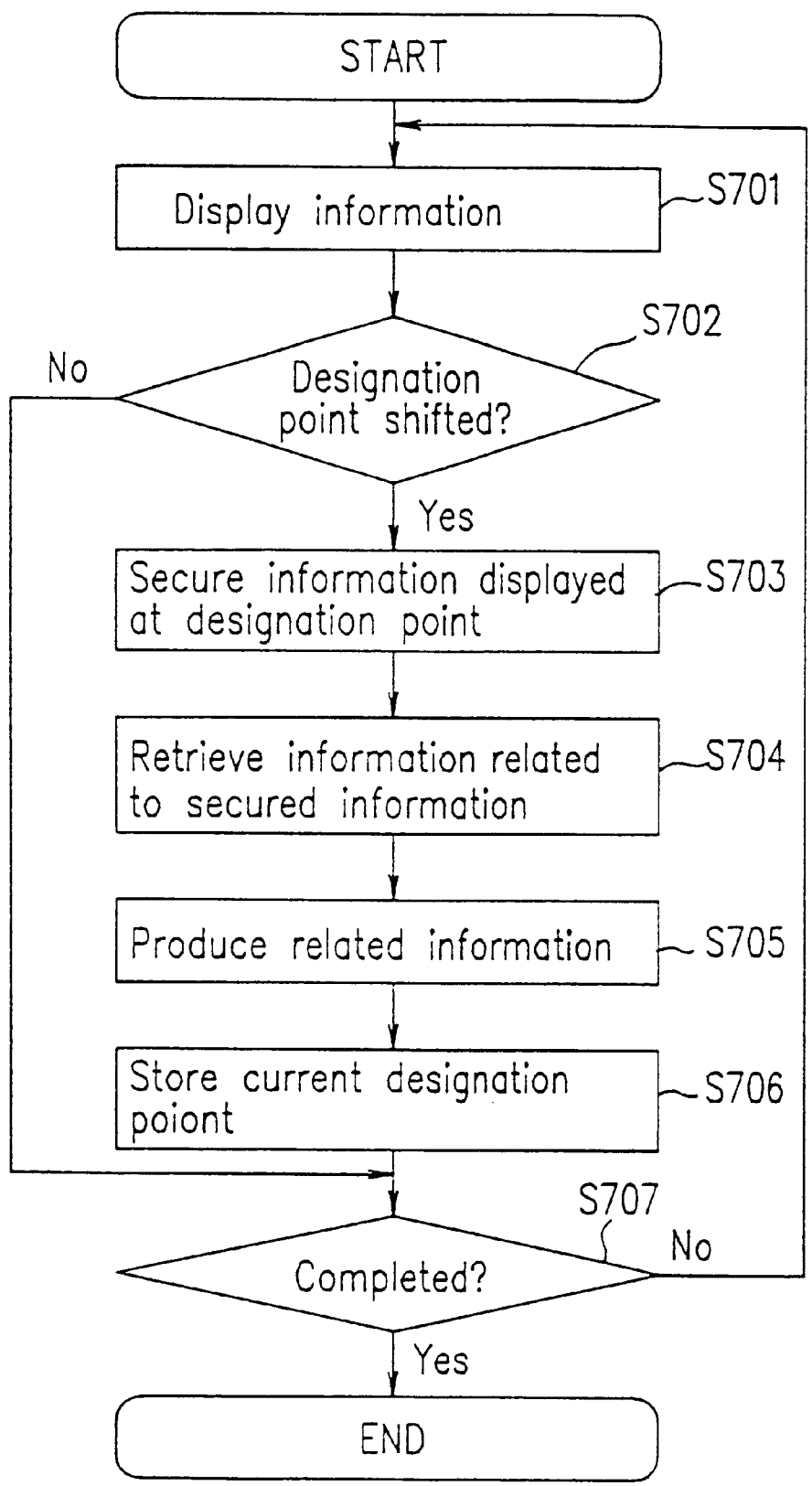
FIG. 11 is a flowchart of the operation of the related information display apparatus of Example 2.

Hereinbelow, the operation of the related information display apparatus of this example shown in FIG. 10 will be described. FIG. 11 is a flowchart of the operation of the related information display apparatus.

At step S701, the information display section 702 reads reference information stored in the information memory device 701, produces a display content to be displayed on the display screen, and displays the produced display content on the display 703.

At step S702, the designation point securing section 705 specifies the coordinates of a designation point on the display screen based on a signal from the designation point controller 704, and judges whether or not the specified coordinates have shifted from the previously specified coordinates on the display screen. If the designation point represented by the coordinates has not shifted, the process proceeds to step S707. The process also proceeds to step S707 when the previously specified coordinates do not exist.

If the designation point has shifted, the information securing section 706 secures information displayed at the position of the designation point from the information display section 702, and outputs the secured information to the related information selecting section 707 at step S703. The information output from the information securing section 706 is the source information for the retrieval.

At step S704, the related information selecting section 707 retrieves information related to the source information output at step S703. Information related to the source information includes specific related information and general information.

At step S705, the related information display section 708 produces a display content to be displayed on a predetermined region of the display 703 from the retrieved related information. At step S706, the designation point securing section 705 stores the coordinates of the current designation point for later judgment on the shift of the designation point.

At step S707, the operation processor 709 judges whether or not all the processes (such as the retrieval and display of related information) have been completed. If not completed, the process returns to step S701. If completed, the operation is terminated. For example, the entire processing starts when the help function is activated and terminates when the help function is inactivated.

Figure 12:
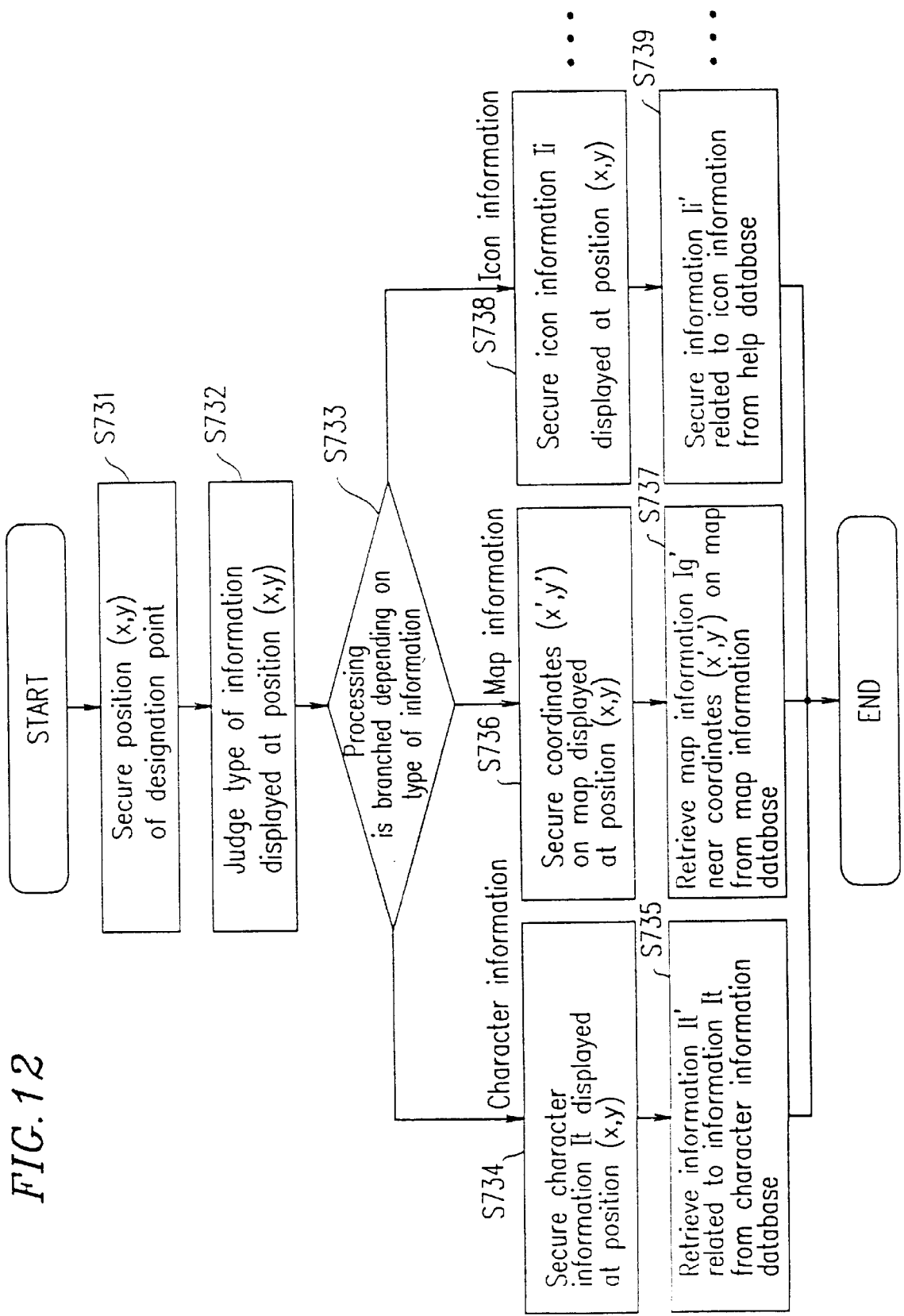
FIG. 12 is a flowchart describing the processings at steps S703 and S704 in FIG. 11 in detail.

The processes at steps S703 and S704 are described in more detail with reference to FIG. 12. FIG. 12 is an exemplified flowchart of the processes at step S703 and S704 in FIG. 11. Steps S731 to S734, S736 and S738 in FIG. 12 correspond to step S703 in FIG. 11, while steps S735, S737, and S739 in FIG. 12 correspond to step S704 in FIG. 11.

At step S731, the designation point securing section 705 secures the coordinates (x,y) of the designation point on the display screen of the display 703 from the designation point controller 704. At step S732, the information securing section 706 secures information displayed on a predetermined range of the display screen including the coordinates (x,y) of the designation point secured at step S731 from the information display section 702, and identifies the type of the information, e.g., character information, map information, or icon information. At step S733, the information securing section 706 classifies the information displayed on the predetermined range of the display screen according to type so as to conduct different processes for different types of information. When the types of information are character information, map information, and icon information, the process proceeds to steps S734, S736, and S738, respectively.

At step S734, the information securing section 706 secures character information It displayed on the coordinates (x,y) of the designation point on the display screen. At step S735, the related information selecting section 707 retrieves related information It' related to the character information It from the information memory device 701 at one stage or multiple stages. The character information includes dictionary information which is general information. The dictionary information belongs to a dictionary information group.

At step S736, the information securing section 706 secures coordinates (x',y') on a map displayed on the coordinates (x,y) of the designation point on the display screen. At step S737, the related information selecting section 707 retrieves map information Ig' having coordinates nearest to the coordinates (x',y') on the map from the information memory device 701 at one stage or multiple stages. The related information selecting section 707 may retrieve a plurality of map information items having coordinates nearer to the coordinates (x', y') on the map as higher relation levels in such a manner that an information item with nearer coordinates is listed above. The map information is one of general information. The map information belongs to a map information group.

At step S738, the information securing section 706 secures icon information Ii displayed on the coordinates (x,y) of the designation point on the display screen. At step S739, the related information selecting section 707 retrieves related information Ii' related to the icon information Ii from the information memory device 701. The icon information is one of general information. The icon information belongs to a help information group.

In this example, the retrieval of character information, map information, and icon information is described. Information other than these types of information can also be retrieved. Also, in the multi-stage retrieval, not only the same type of related information, but also different types of related information can be retrieved hierarchically.

Now, four examples of methods for retrieving related information in the related information display apparatus of this example will be described with reference to FIGS. 13 to 16.

Method 1

A case where the related information display apparatus of this example shown in FIG. 10 retrieves dictionary related information from an English-Japanese dictionary will be described.

The information memory device 701 stores a dictionary information group consisting of English words and their corresponding Japanese words, as shown in FIG. 13.

If the information unit secured at step S703 is an English word "abandon", for example, the English word "abandon" is searched for in the dictionary information group to find the corresponding Japanese word "sutesaru" and display the latter on the display screen as the related information. This processing corresponds to the retrieval at step S735. The apparatus may be designed to further retrieve the meaning of the Japanese word "sutesaru" automatically and hierarchically. Alternatively, this further retrieval of the meaning may automatically be conducted only for difficult words.

Method 2

A case where related information is retrieved from coordinates on a map which is one of general map information will be described. The information memory device 701 stores a map information group which consists of coordinates on a map and place/building names, and the like, corresponding to these coordinates as shown in FIG. 14.

The differences (distances) between the coordinates of the designation point on the map displayed on the display screen and the coordinates of related information stored in the map information group are calculated, and the place/building name corresponding to the shortest distance is output as the related information.

For example, when the coordinates of the designation point on the map displayed on the display screen are (1016, 3266), "Nara Dreamland" is output as the related information. This process corresponds to the retrieval at step S737.

Method 3

A case where information related to the place/building name which is related to the designation point on the map displayed on the display screen is further retrieved in a multi-stage manner will be described with reference to FIG. 15.

FIG. 15 includes three different information groups, i.e., a place/building name information group, an image information group, and a text information group. These three information groups correspond to one another.

When a place/building name has its corresponding image information and text information stored in the information memory device 701, the image information and the text information can be retrieved as the related information of the place/building name.

Thus, as described above, the multi-stage retrieval is possible, where a place/building name is first retrieved from specific coordinates on a map displayed on the display screen as related information, and image information and text information corresponding to the place/building name are then retrieved.

Method 4

A case where help information is retrieved from the user's operation on the display screen in a window system will be described with reference to FIG. 16.

The information memory device 701 stores a help information group consisting of event sequences showing the user's operation and help messages corresponding to the respective event sequences as shown in FIG. 16. If the information secured at step S703 is icon information, a help message corresponding to the event sequence showing the user's operation is retrieved and displayed as the related information. The code "%s" in the help messages in FIG. 16 represents a character sequence to be replaced with the content of a variable sandwiched by $s. This procedure corresponds to the retrieval at step S739 in FIG. 12.

In methods 1 to 4 above shown with reference to FIGS. 13 to 16; not only completely corresponding information, but also information with high similarity can be retrieved and displayed as related information. Also, the number of related information items is not necessarily one, but a plurality of related information candidates can be retrieved.

Figure 17:
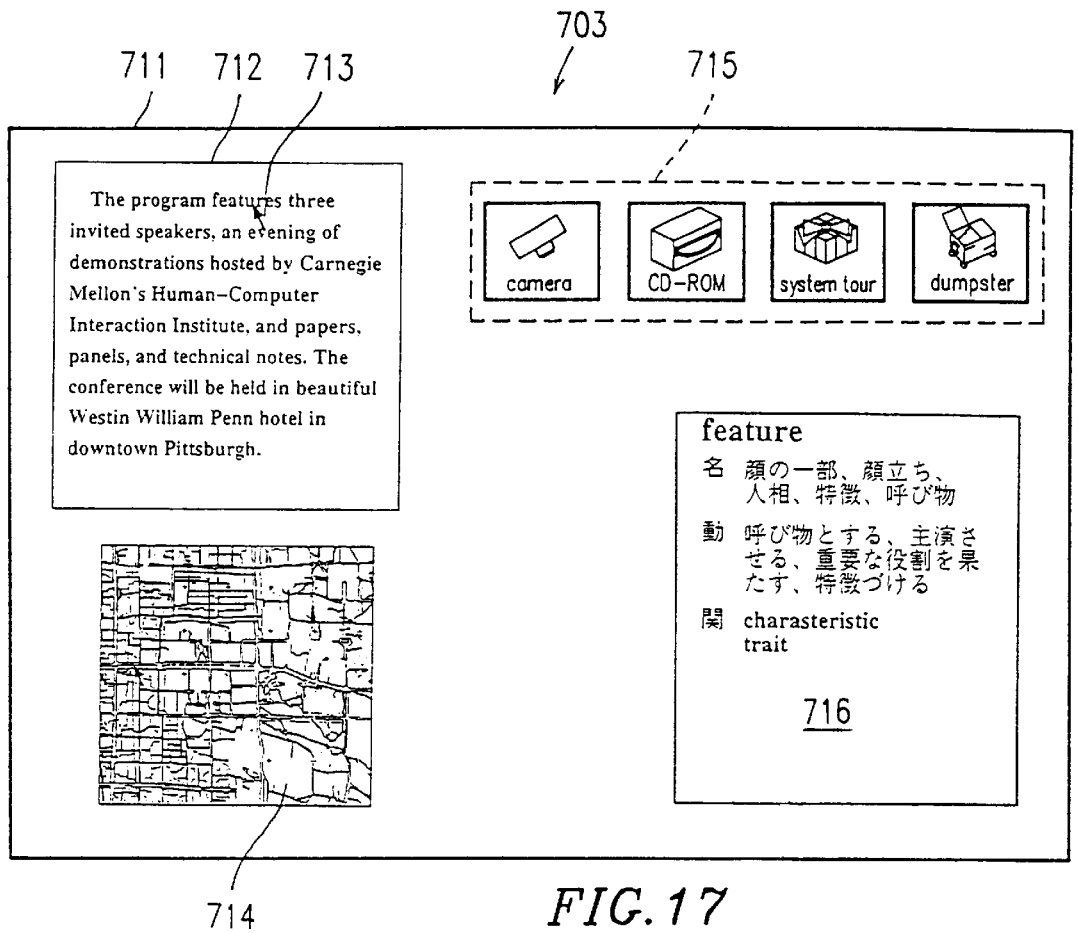
FIG. 17 is an example of the entire display screen of a display of the related information display apparatus of Example 2.

FIG. 17 is an example of the entire display screen of the display 703 of the related information display apparatus of this example shown in FIG. 10.

Referring to FIG. 17, a document display region 712 is located upper left of a display screen 711 of the display 703. An English text is displayed on the document display region 712 as the reference information. An English word "features" on the document display region 712 is pointed to by a mouse cursor 713. This pointed position is considered the user's designation point. The mouse cursor 713 can be moved to a certain position by use of a mouse as the designation point controller 704. A map display region 714 is located lower left of the display screen 711, where a map is displayed.

An icon display region 715 is located upper right of the display screen 711. The icons symbolize files, functions of the computer system, and the like, and can be chosen directly as operations. A related information display region 716 is located lower right of the display screen 711. Related information obtained by the related information selecting section 707, e.g., information related to the English word "features" pointed to by the mouse cursor 713, is displayed on the related information display region 716 via the related information display section 708. The position and size of the related information display region 716 are not fixed but may be changed so that related information can be displayed near the user's designation point.

In this case, the position of the mouse cursor 713 is considered the user's designation point. Alternatively, the position of a text editor cursor may be used as the user's designation point, or the focal point of the user's eyes can be detected and used as the designation point. Otherwise, a specific position on the display screen of the display 703 may be used as a fixed designation point.

Figure 18:
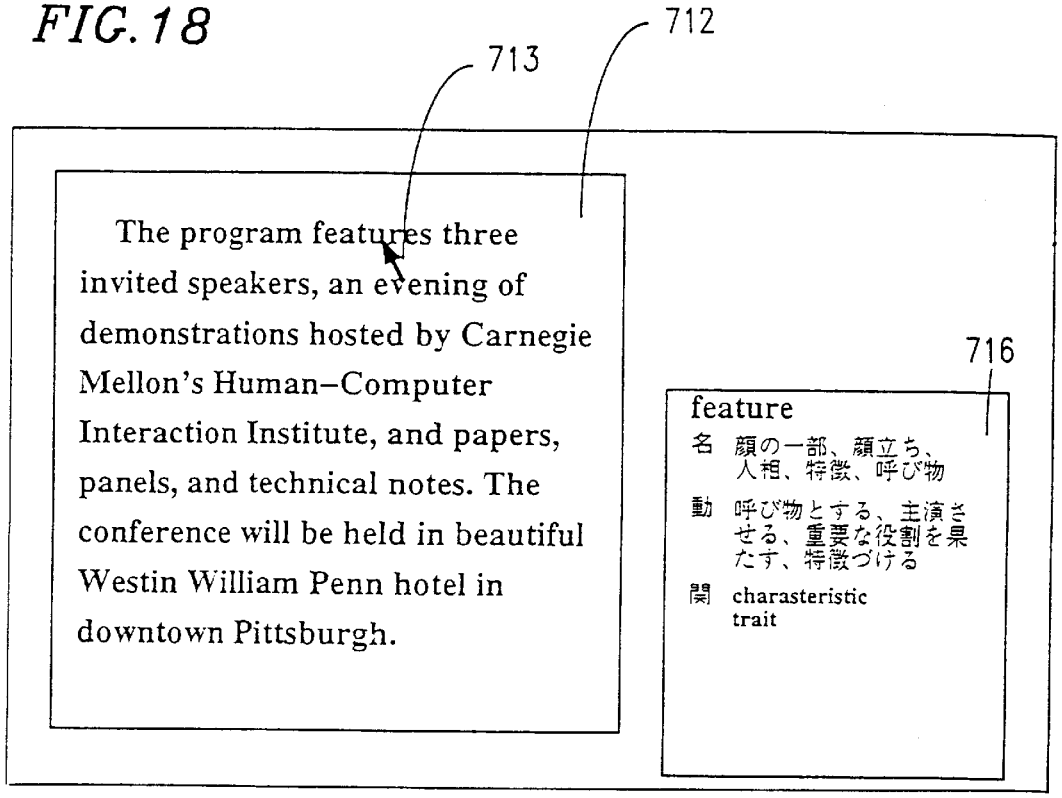
FIG. 18 is an example of a document display region and a related information display region of the display screen of FIG. 17.

FIG. 18 is another example of the document display region 712 and the related information display region 716 on the display screen.

Referring to FIG. 18, the position of the mouse cursor 713 on the document display region 712 is considered the user's designation point. Related information retrieved from the dictionary information group stored in the information memory device 701 is displayed on the related information display region 716 as the information related to the English word "features" pointed to by the mouse cursor 713. In other words, as soon as the mouse cursor 713 enters a predetermined territory of the English word "features", related information of the word "features" is automatically selected and displayed on the related information display region 716 of the display screen.

Even when the word "features" is not registered in the dictionary information group, a word with high similarity to the word "features", for example, a word "feature" can be used for the retrieval of the related information. The conformity level of a spelling to another spelling can be determined by the following methods:

1) as a simple example, by counting the number of characters from the beginning of one word conforming to the other word; and 2) by counting the number of characters of one word conforming to the characters of the other word.

The latter method is applicable even when the word is misspelled. In the methods 1) and 2), inflections, special plural forms, special past particles, and the like may be stored.

Figure 19:
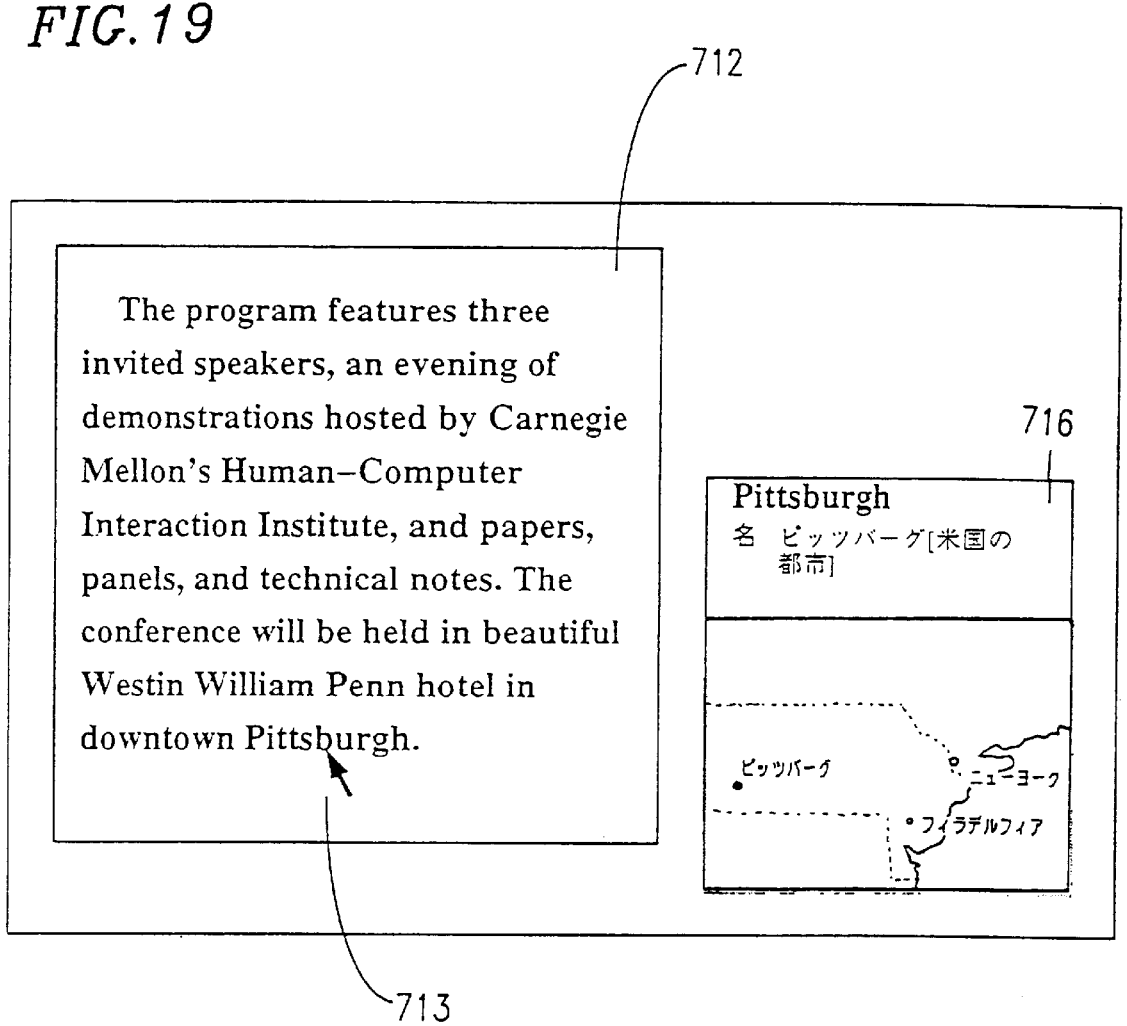
FIG. 19 is another example of the document display region and the related information display region of the display screen of FIG. 17.

Another example of related information displayed on the related information display region 716 will be described with reference to FIG. 19.

An English word "Pittsburgh", which is character information displayed on the document display region 712, is pointed to by the mouse cursor 713. Related information retrieved from the dictionary information group and a map of Pittsburgh and the surrounding area retrieved from the map information group are displayed on the related information display region 716 as information related to the word "Pittsburgh".

In this case, the retrieved related information includes different types of information, i.e., dictionary information and map information. The retrieval can be conducted not only at one stage but also at two or more stages. In this example, the map of Pittsburgh and the surrounding area shown on the related information display region 716 is rough as shown in FIG. 19. A more detailed map or an illustration showing the position clearly may also be implemented.

EXAMPLE 3

A second example of the related information display apparatus according to the present invention will be described as Example 3 with reference to FIG. 20. Components having the same functions and effects as those in Example 2 are denoted by the same reference numerals, and the description thereof is omitted.

Figure 20:
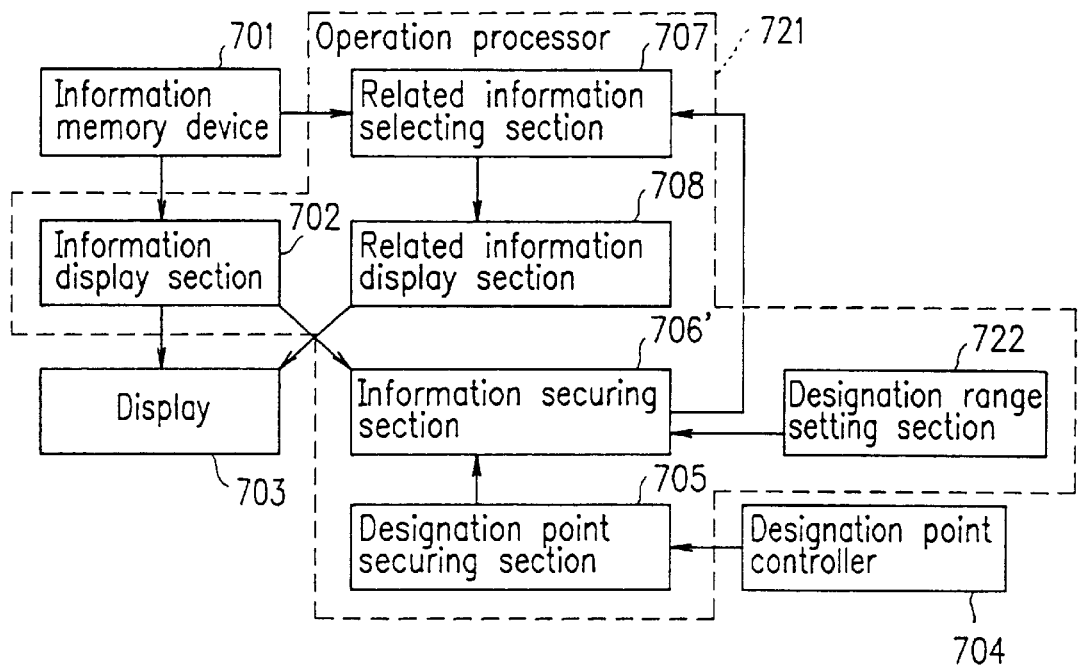
FIG. 20 is a block diagram of a related information display apparatus of Example 3 according to the present invention.

Referring to FIG. 20, the related information display apparatus of this example includes an information memory device 701, a display 703, a designation point controller 704, and an operation processor 721. The operation processor 721 includes an information display section 702, a designation point securing section 705, an information securing section 706', a related information selecting section 707, a related information display section 708, and a designation range setting section 722.

The designation range setting section 722 is connected to the information securing section 706', and sets the range designated by the user. More specifically, the designation range setting section 722 specifies and sets the range of an information unit, such as one word or a plurality of words, to be designated from the reference information displayed on the display screen.

Hereinbelow, the operation of the related information display apparatus of this example shown in FIG. 20 will be described. The flowchart of the entire retrieval operation of the related information display apparatus of this example is the same as that of FIG. 11 used in Example 2.

Figure 21:
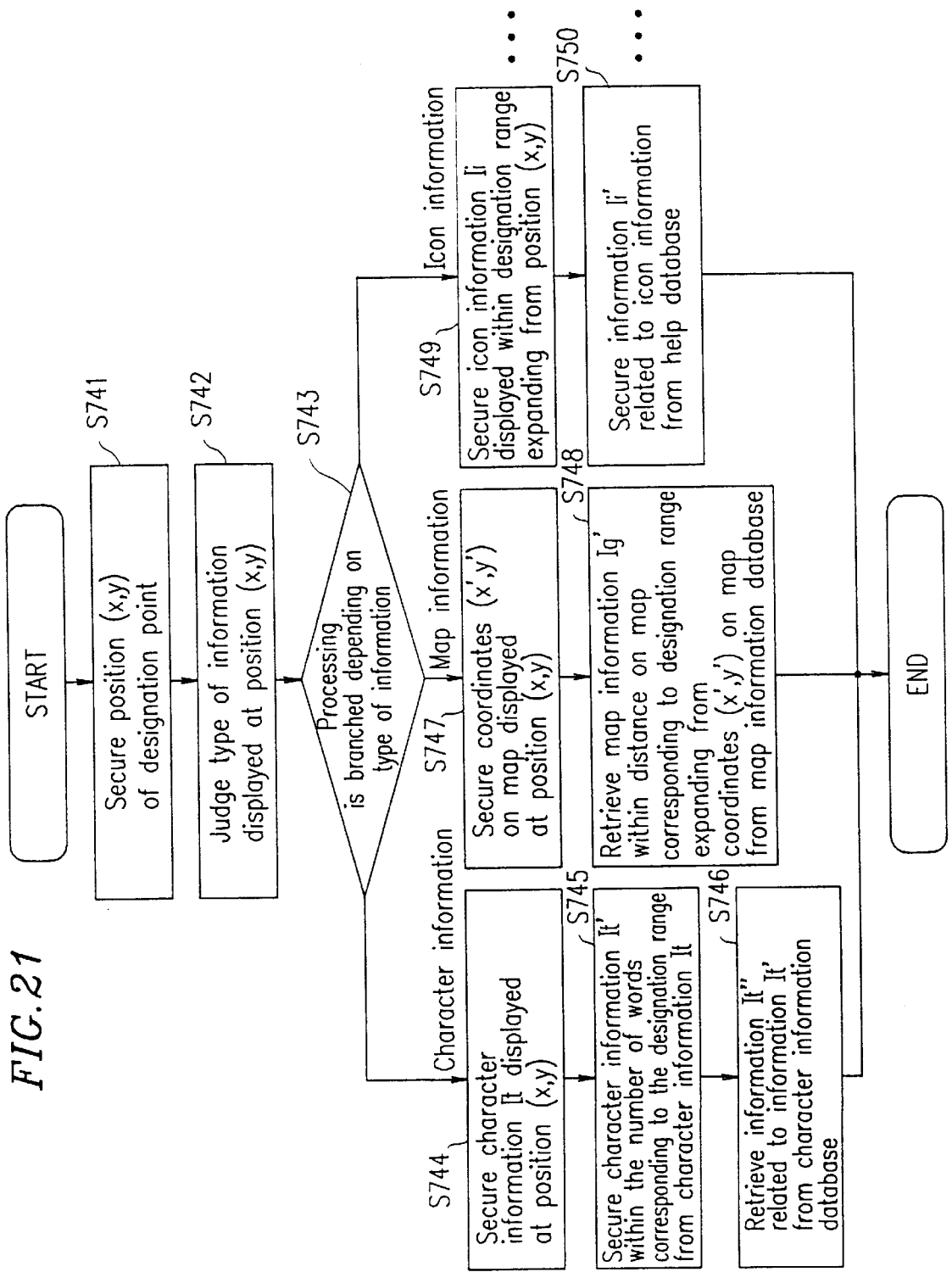
FIG. 21 is a flowchart for describing a retrieval operation of the related information display apparatus of Example 3 in detail.

The processings at steps S703 and S704 shown in FIG. 11 will be described in detail using the flowchart of FIG. 21. Steps S741 to S745, S747 and S749 in FIG. 21 correspond to step S703 in FIG. 11, while steps S746, S748, and S750 in FIG. 21 correspond to step S704 in FIG. 11.

At step S741, the designation point securing section 705 secures the coordinates (x,y) of the designation point on the display screen of the display 703 from the designation point controller 704. At step S742, the information securing section 706' secures the information unit displayed on a predetermined range of the display screen including the coordinates (x,y) of the designation point secured at step S741 from the information display section 702, and identifies the type of the information, e.g., character information, map information, or icon information. At step S743, the information securing section 706' classifies the information displayed on the predetermined range of the display screen depending on the type thereof so as to conduct different processings for different types of information. When the types of the information displayed on the predetermined range are character information, map information, and icon information, the process proceeds to steps S744, S747, and S749, respectively.

At step S744, the information securing section 706' secures character information It (composed of one character, for example) displayed on the coordinates (x,y) of the designation point on the display screen. At step S745, the related information selecting section 707 selects information with the number of characters corresponding to the designation range from the character information It, and secures as character information It'. The designation range is set by the designation range setting section 722. At step S746, based on the character information It', the related information selecting section 707 retrieves information It" related to the character information It' from the character information group stored in the information memory device 701.

At step S747, the information securing section 706' secures coordinates (x',y') on a map corresponding to the coordinates (x,y) of the designation point on the display screen obtained from the information display section 702. At step S748, the related information selecting section 707 retrieves map information Ig' existing in the range corresponding to the designation range expanding from the secured coordinates (x',y') on the map from the information memory device 701. The designation range is set by the designation range setting section 722.

At step S749, the information securing section 706' secures icon information Ii related to an icon or icons displayed within the designation range expanding from the coordinates (x,y) of the designation point on the display screen. The designation range is set by the designation range setting section 722. At step S750, the related information selecting section 707 retrieves information Ii' related to the icon information Ii from the help information group in the information memory device 701.

In this example, character information, map information, and icon information are used as the types of source information displayed on the display screen. The above processes are also possible for other types of information, such as address information, telephone number information, and image information including motion pictures and photographs. Specific related information such as the user's memo information and information linked by the user can also be used.

Figure 22:
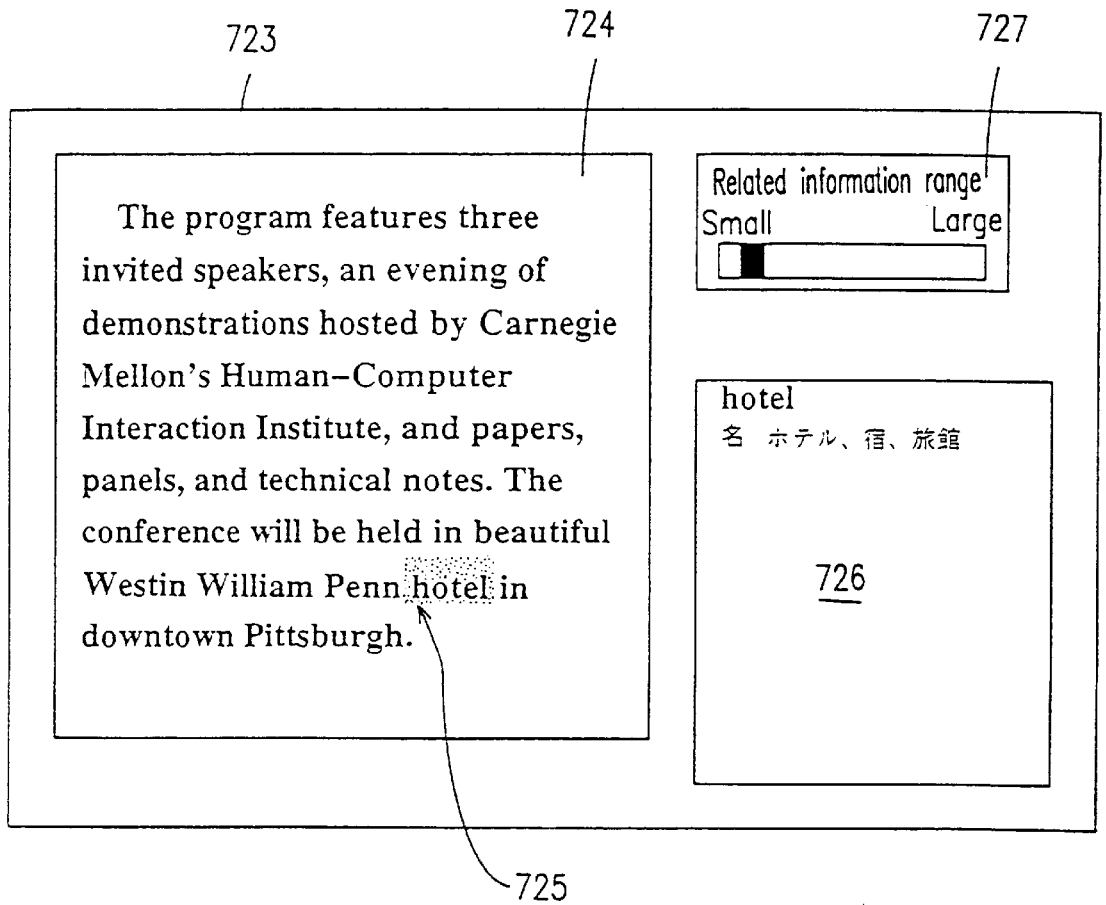
FIG. 22 is an example of the display screen when related information is retrieved by narrowing the related information range by a designation range setting section of the related information display apparatus of Example 3.
Figure 23:
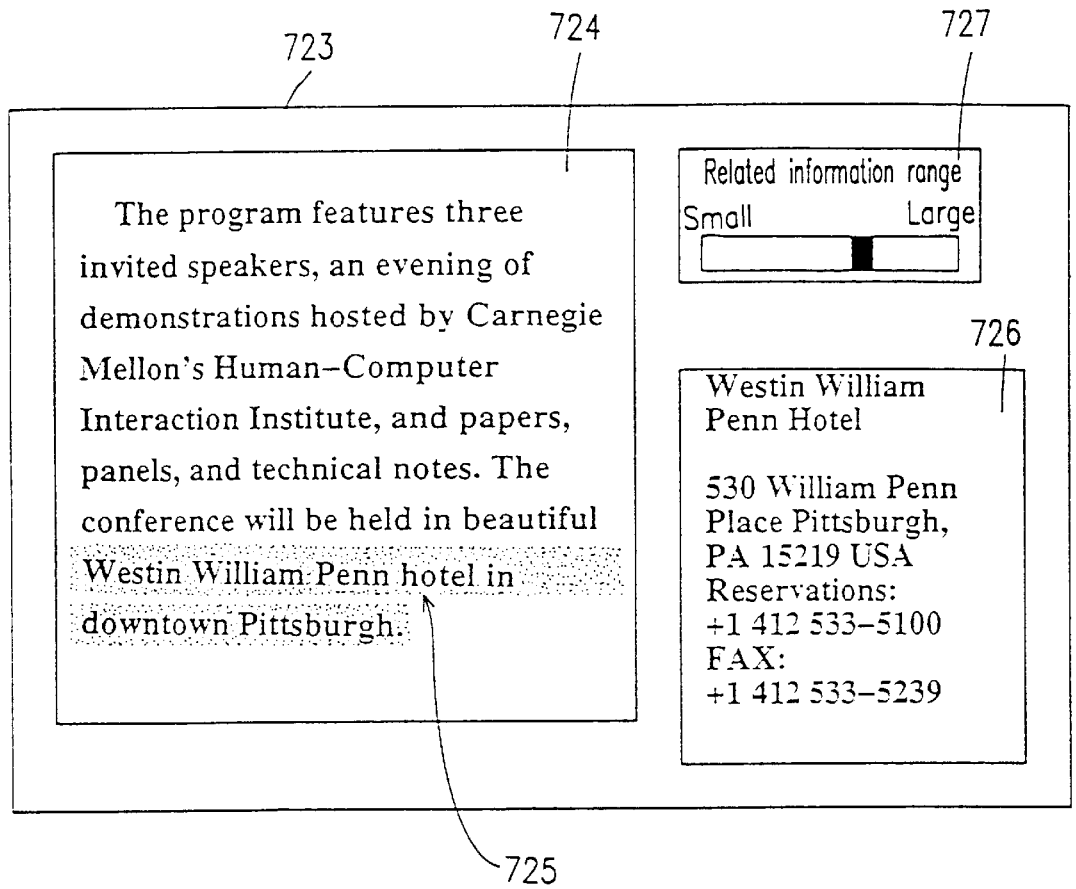
FIG. 23 is an example of the display screen when related information is retrieved by widening the related information range by a designation range setting section of the related information display apparatus of Example 3.

FIGS. 22 and 23 are examples of the display screen where the designation range is set by the designation range setting section 722 for retrieving related information.

English text is displayed on a document display region 724 located left of a display screen 723 of the display 703. The position pointed to by a mouse cursor 725 on the document display region 724 is considered the user's designation point. A related information display region 726 is located lower right of the display screen 723. Information related to an information unit (e.g., one word; "hotel" in this case) in the text pointed to by the mouse cursor 725 ("noun—hoteru, yado, ryokan" in this case) is displayed on the related information display region 726. A region 727 indicating the range of the related information is disposed upper right of the display screen 723. The setting of the designation range on the region 727 is controlled by the designation range setting section 722, and the user can change the designation range via the designation range setting section 722.

In FIG. 22, the designation range is shown by highlighting the characters in the text corresponding to the designation range expanding from the character pointed to by the mouse cursor 725. Related information related to the highlighted characters is retrieved from dictionary information, and the like, and the retrieved related information is displayed on the related information display region 726.

In the example shown in FIG. 22, since the designation range is comparatively small, only the word pointed to by the mouse cursor, a word "hotel" in this example, is highlighted, and Japanese words corresponding to this English word are displayed on the related information display region 726 as the related information.

Incidentally, at step S744, the information securing section 706' may secure one-word character information It pointed to by the mouse cursor 725. In this case, information with the number of words corresponding to the designation range is selected from the one-word character information It, and the selected information is secured as the character information It'. The designation range is set by the designation range setting section 722 as described above. At step S746, based on the character information It', the related information selecting section 707 retrieves information It" related to the character information It' from the character information group stored in the information memory device 701.

In the example shown in FIG. 23, since the designation range is comparatively large, each three words before and after the word pointed to by the mouse cursor 725 are highlighted as designated character information. In this example, since the concrete hotel name and its place are included in the designation range, the address, telephone number, and FAX number of the hotel are retrieved as related information and displayed on the related information display region 726. It will be more convenient when actually visiting the hotel if a map, the position on the map, a photograph showing the appearance of the hotel, and the like, are additionally displayed. This will be described in detail in Example 4 later. Thus, according to the present invention, various types of related information can be displayed by providing selectable various types of related information.

The selected related information can be narrowed to obtain more detailed information by specifying the designation range as one word or two words, for example. By this narrowing, more accurate retrieval is possible.

In this example, the designation range is set per word which is divided by a space. The character, the line, and the like may also be used as the division unit. When related information related to a character sequence is retrieved, the results retrieved based on the character sequence or part of the character sequence, if it is similar to the entire character sequence, can be used as the related information. In this case, a plurality of candidates may be displayed as described above.

The designation range setting section 722 may be designed so that the designation range can be set automatically by judging the user's designation range from the user's operation history, and the like, even when the user does not operate directly. In the case where no related information is retrieved as the designation range is too small, the designation range may be widened automatically until retrieved related information appears.

EXAMPLE 4

A third example of the related information display apparatus according to the present invention will be described as Example 4 with reference to FIG. 24. Components having the same functions and effects as those in Example 2 are denoted by the same reference numerals, and the description thereof is omitted.

Figure 24:
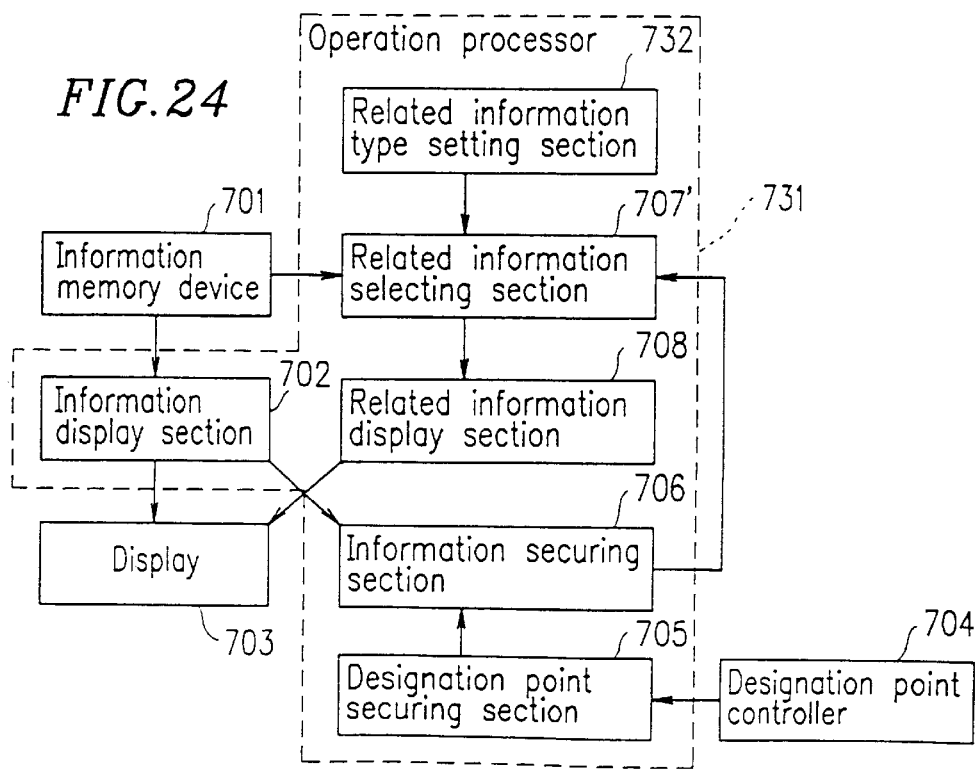
FIG. 24 is a block diagram of a related information display apparatus of Example 4 according to the present invention.

Referring to FIG. 24, the related information apparatus of this example includes an information memory device 701, a display 703, a designation point controller 704, and an operation processor 731. The operation processor 731 includes an information display section 702, a designation point securing section 705, an information securing section 706, a related information selecting section 707', a related information display section 708, and a related information type setting section 732.

The related information type setting section 732, which is connected to the related information selecting section 707', sets the type of information to be displayed as the related information. Specifically, the related information type setting section 732 presets the type of related information desired by the user at the selection of related information related to an information unit designated by the user.

Hereinbelow, the operation of the related information display apparatus of this example shown in FIG. 24 will be described. The flowchart of the entire retrieval operation of the related information display apparatus of this example is the same as that of FIG. 11 used in Example 2. In this example, in steps S735, S737, and S739 in FIG. 12, only a database including the type of related information set by the related information type setting section 732 is used.

Figure 25:
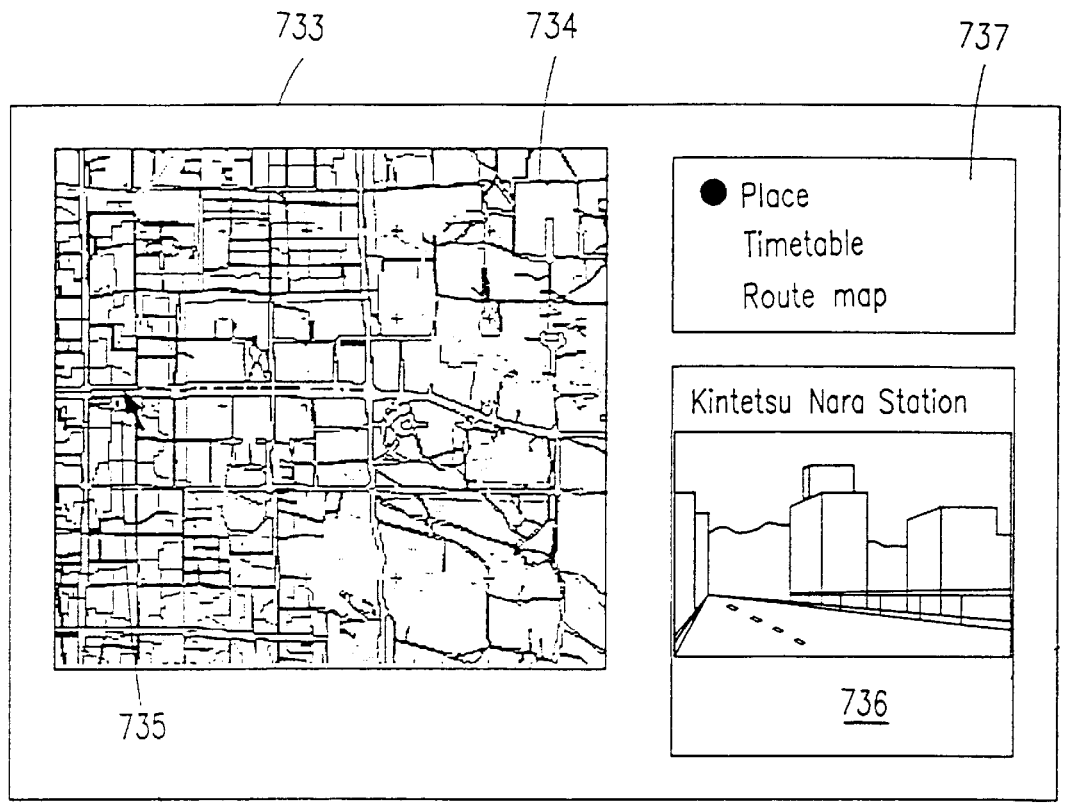
FIG. 25 is an example of the display screen when the type of related information is specified as the place by the related information type setting section of the related information display apparatus of Example 4.
Figure 26:
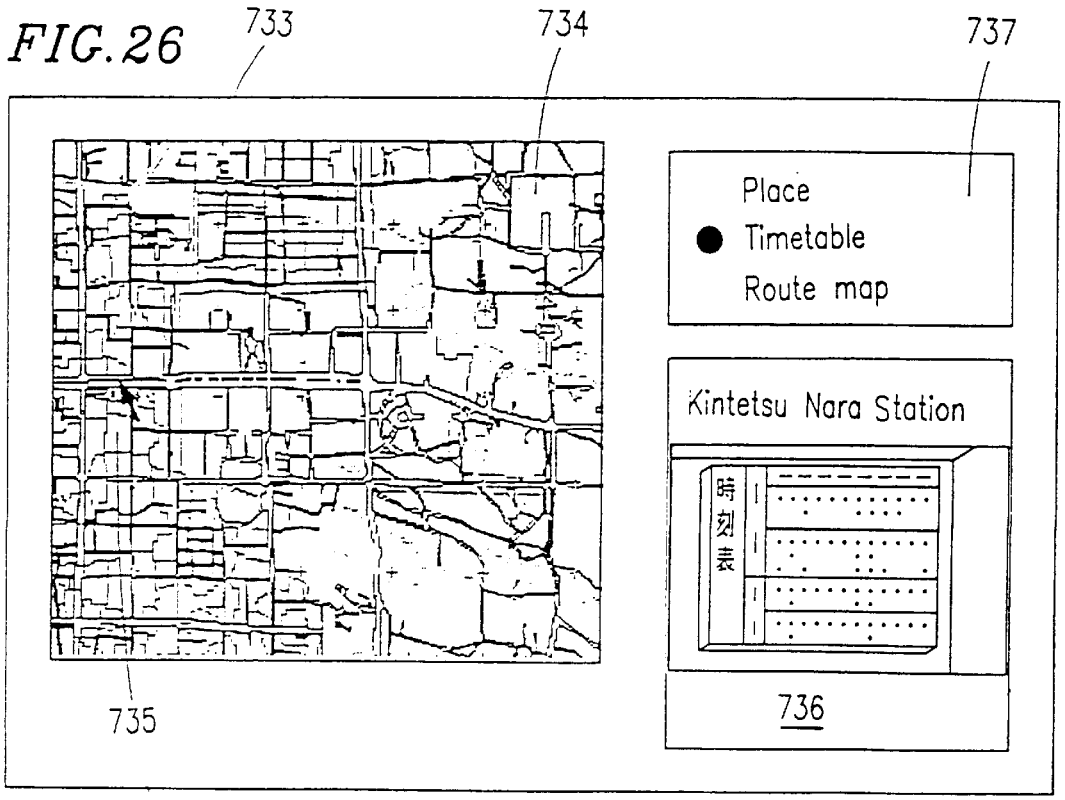
FIG. 26 is an example of the display screen when the type of related information is specified as the timetable by the related information type setting section of the related information display apparatus of Example 4.

FIGS. 25 and 26 are examples of the display screen where related information is obtained by specifying the type of related information by the related information type setting section 732.

Referring to FIG. 25, a map display region 734 for displaying map information is located left of a display screen 733. The position pointed to by a mouse cursor 735 is considered the user's designation point. Related information related to the position pointed to by the mouse cursor 735 is displayed on a related information display region 736 located lower right of the display screen 733. A type selection region 737 for selecting the type of related information is located upper right of the display screen 733. The user selects a desired type of related information from a list of types of related information displayed on the type selection region 737. This operation is conducted under the control of the related information type setting section 732.

In the example shown in FIG. 25, the type marked ●, i.e., "place", is selected on the type selection region 737. With this selection, the name of the place/building located nearest to the position on the map pointed to by the mouse cursor 735 is displayed on the related information display region 736 as the related information. In FIG. 25, "Kintetsu Nara Station" is displayed as the nearest place, together with an image of its appearance. In FIG. 25, the image of "Kintetsu Nara Station" displayed on the related information display region 736 is rough. A picture with a higher resolution, a motion picture, or an illustration showing the feature clearly may also be implemented.

In the example shown in FIG. 26, the "timetable" has been selected as the type of related information. With this selection, the "timetable" of "Kintetsu Nara Station" which is the place nearest to the position on the map pointed to by the mouse cursor 735, is displayed on the related information display region 736. The name of the place "Kintetsu Nara Station" is also displayed on the related information display region 736.

Thus, by presetting the type of related information to be displayed, related information desired by the user can be correctly obtained.

The related information display apparatus of this example shown in FIG. 24 may also be designed so that the type of related information desired by the user can be automatically judged from the user's operation history, and the like, without the user's selection of the type of related information.

The list of types of related information displayed on the type selection region 737 may be made previously, or may be automatically produced judging from the type of information at the user's designation point, the types of information expected from the user's operation history, and the like.

The listed types of information vary depending on the information at the position on the display screen pointed to by the mouse cursor. In the examples shown in FIGS. 25 and 26, since the place nearest to the pointed position happens to be a station, the type items such as "place", "timetable", and "route map" are displayed.

In the example shown in FIG. 26, although the image of the timetable of Kintetsu Nara Station is rough, the timetable should be clearly and legibly displayed as an image of an actual timetable or an illustration thereof.

EXAMPLE 5

A fourth example of the related information display apparatus according to the present invention will be described as Example 5 with reference to FIG. 27. Components having the same functions and effects as those in Example 2 are denoted by the same reference numerals, and the description thereof is omitted.

Figure 27:
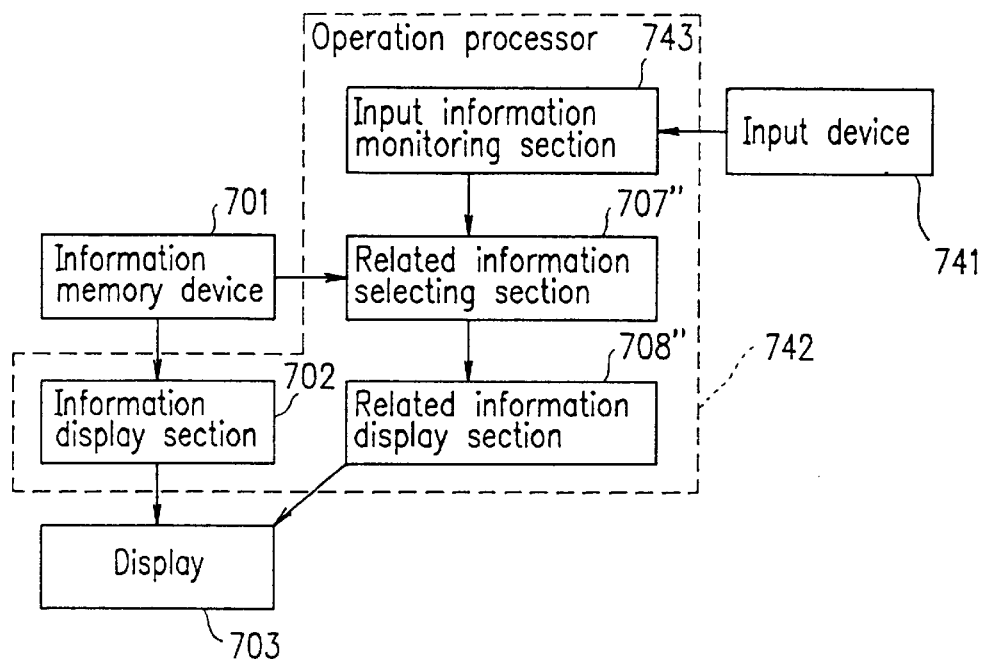
FIG. 27 is a block diagram of a related information display apparatus of Example 5 according to the present invention.

Referring to FIG. 27, the related information display apparatus of this example includes an information memory device 701, a display 703, a designation point controller 704, an input device 741, and an operation processor 742. The operation processor 742 includes an information display section 702, a related information selecting section 707", a related information display section 708", and an input information monitoring section 743.

The input device 741 is a device which receives or operates information, such as a keyboard and a mouse. The input information monitoring section 743, which is connected to the related information selecting section 707", monitors information input or operated by the input device 741 to judge whether or not information has been input or operated. Then, the input information monitoring section 743 stores the input or operated information for later judgment.

Figure 28:
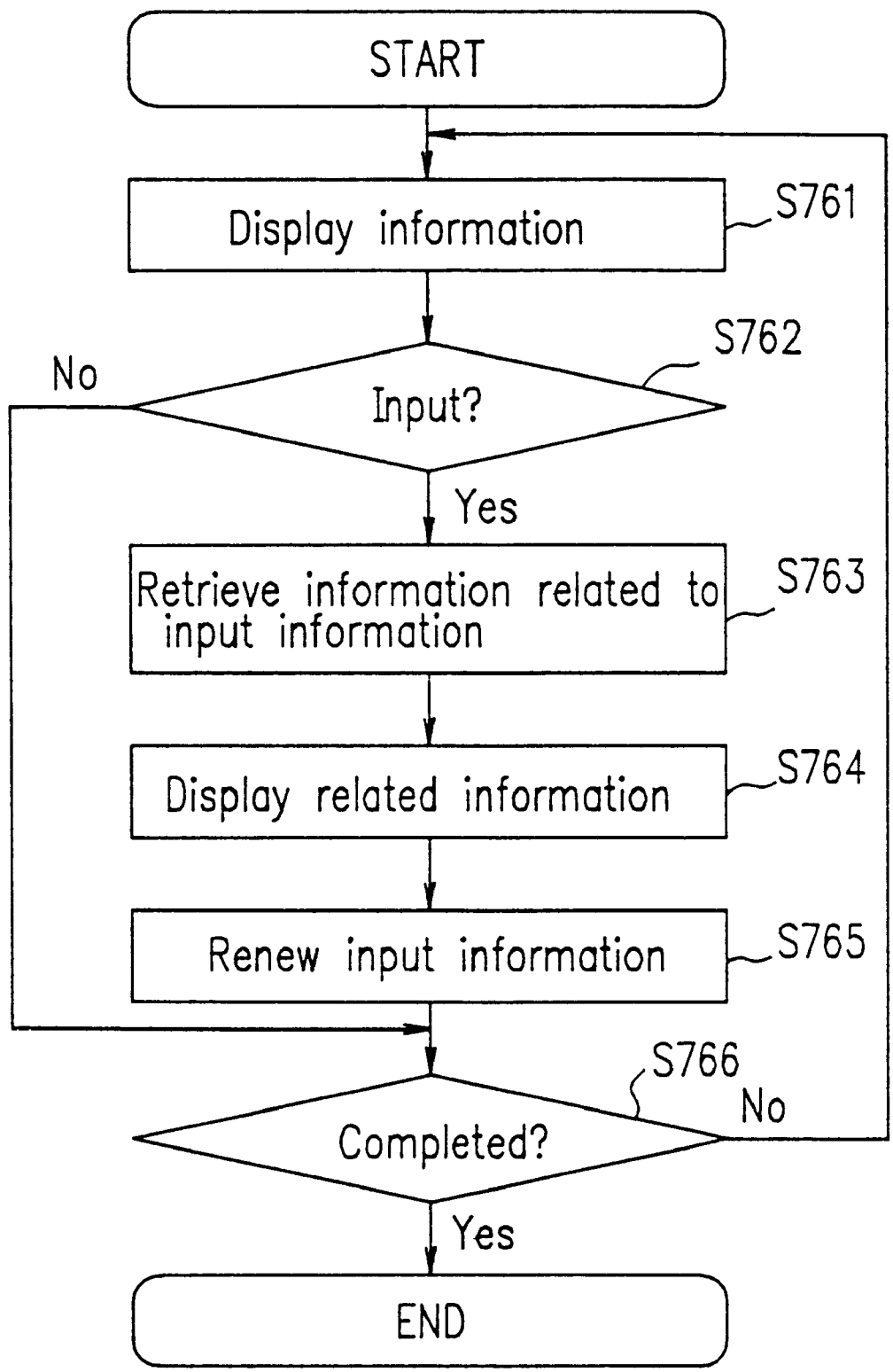
FIG. 28 is a flowchart of an operation of the related information display apparatus of Example 5.

Hereinbelow, the operation of the related information display apparatus of this example shown in Example 27 will be described with reference to FIG. 28. FIG. 28 is a flowchart of a retrieval operation of the related information display apparatus of this example.

At step S761, the information display section 702 reads information stored in the information memory device 701, produces a display content to be displayed on the display screen, and displays the produced display content on the display 703.

At step S762, the input information monitoring section 743 monitors the input device 741 to receive input information or operated information therefrom. By comparing the current input information or operated information with the previously-received input information or operated information, the input information monitoring section 743 judges whether or not the user has input or operated information.

If no input or operation has been conducted by the user, the process proceeds to step S766.

If any input or operation has been conducted by the user, the related information selecting section 707" retrieves information related to the input or operated information from a database in the information memory device 701 at step S763. At step S764, the related information display section 708" produces a content to be displayed on the display screen of the display 703, and displays the related information on the display 703. At step S765, the input information monitoring section 743 stores the current input or operated information for later judgment on input or operation. Alternatively, the input or operated information may be renewed so that the current input or operated information can be stored while the oldest input or operated information is erased. At step S766, steps S761 through S765 are repeated until the entire operation is completed.

The retrieval at step S763 corresponds to the retrieval operation shown in FIG. 12.

Figure 29:
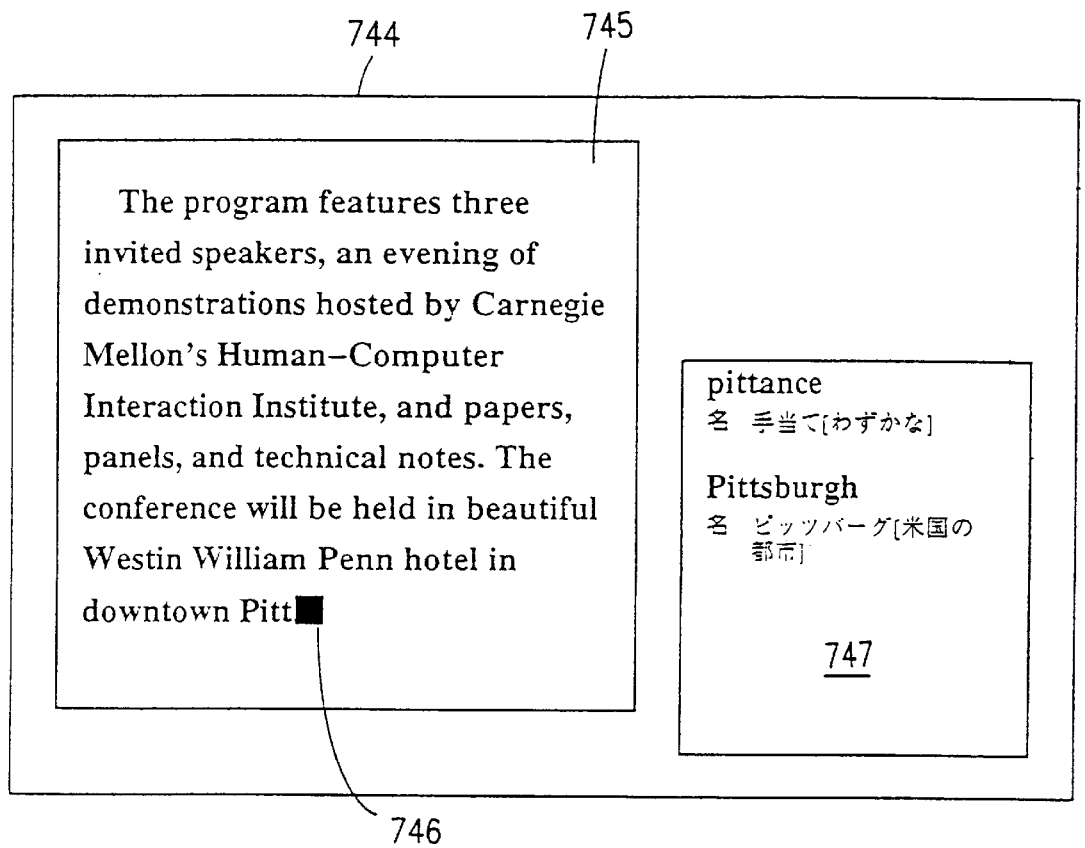
FIG. 29 is an example of the display screen for describing a related information retrieval by the related information display apparatus of Example 5.
Figure 30:
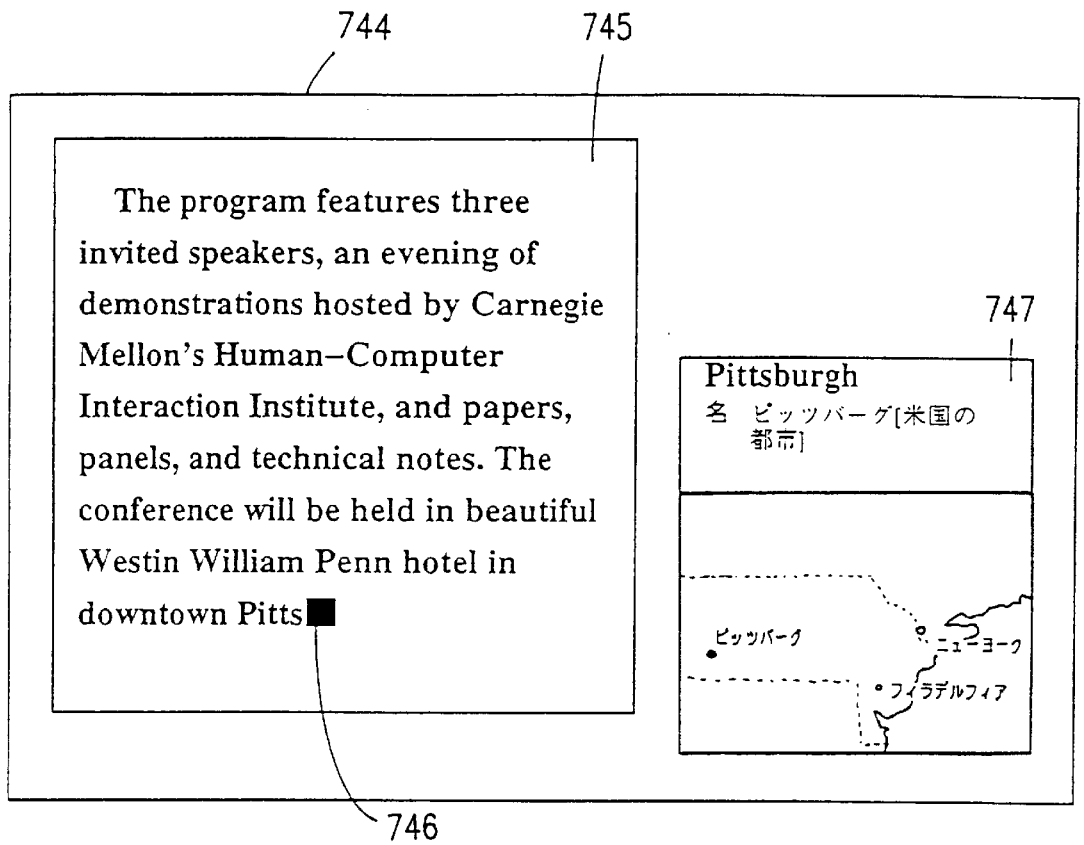
FIG. 30 is another example of the display screen for describing the related information retrieval by the related information display apparatus of Example 5.

FIGS. 29 and 30 are examples of the display screen obtained by a related information retrieval operation by the related information display apparatus of this example shown in FIG. 27.

English text is displayed on a document display region 745 located left of a display screen 744. A cursor 746 is located at the position where a character is to be entered next. In other words, the cursor 746 indicates the position of a character to be entered next. Related information related to an information unit (e.g., one word) at or around the position indicated by the cursor 746, is displayed on a related information display region 747 located lower right of the display screen 744. A plurality of candidates of the related information may be displayed on the related information display region 747. In the example shown in FIG. 29, characters "Pitt" have been entered on the document display region 745. Information related to "Pitt" is retrieved from dictionary information, and the results are displayed on the related information display region 747. Specifically, two English words related to "Pitt" and the respective Japanese words are displayed.

In the example shown in FIG. 30, an additional character "s" has been entered via the keyboard, forming "Pitts". As a result, a word "Pittsburgh" retrieved from the dictionary information and a map image corresponding to "Pittsburgh" are displayed in real time on the related information display region 747 as the related information of "Pitts".

The input information stored in the input information monitoring section 743 may be cleared when a series of information is terminated. For example, in the case of document input operation, the stored information may be cleared when the space key is pressed. In FIG. 30, the map of Pittsburgh and the surrounding area displayed on the related information display region 747 is rough. A more detailed map or an illustration showing the position clearly may also be used.

Figure 31:
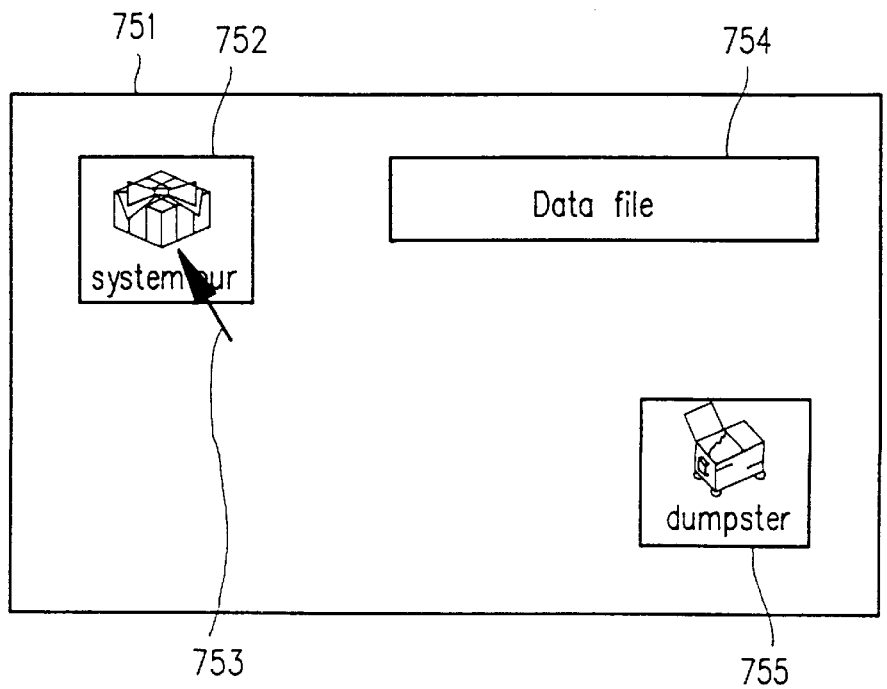
FIG. 31 is an example of the display screen for describing another retrieval by the related information display apparatus of Example 5.
Figure 32:
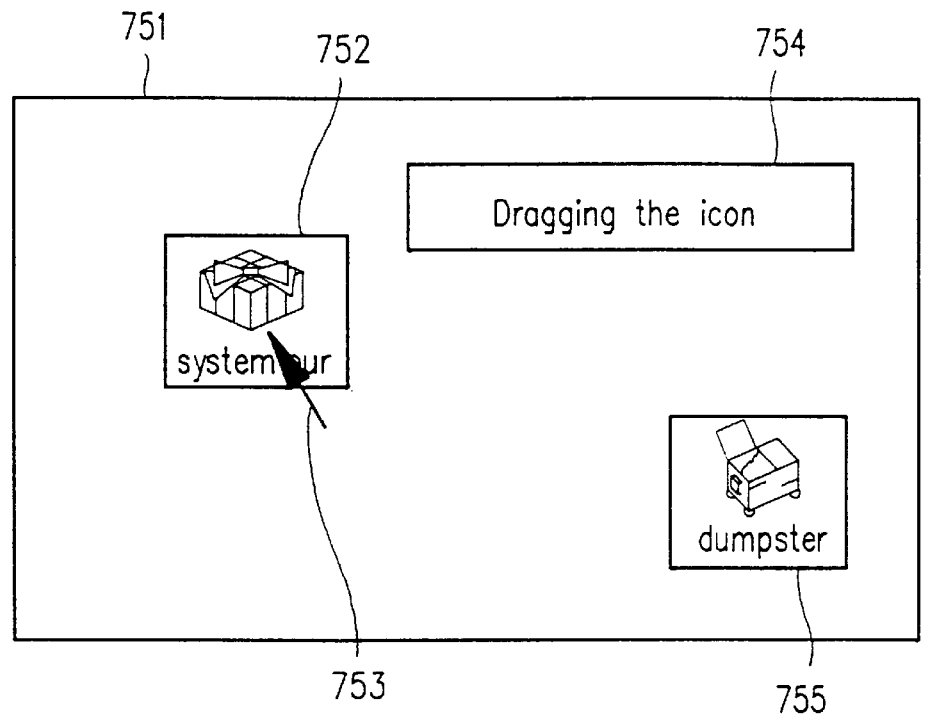
FIG. 32 is another example of the display screen for describing the retrieval by the related information display apparatus of Example 5.
Figure 33:
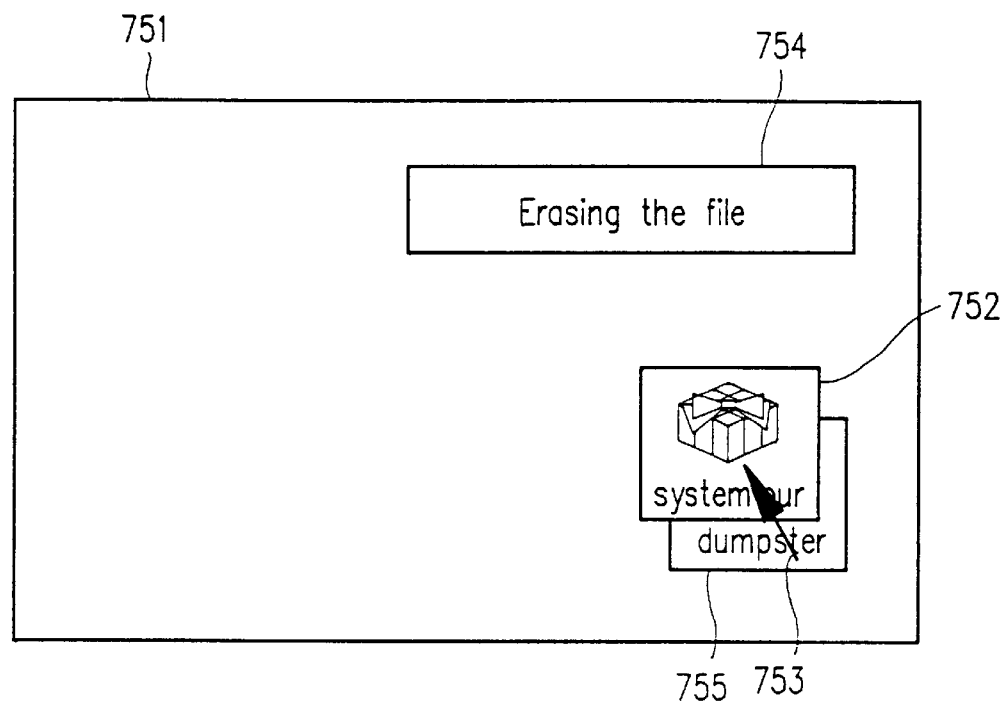
FIG. 33 is still another example of the display screen for describing the retrieval by the related information display apparatus of Example 5.

FIGS. 31 to 33 are examples of the display screen obtained by another related information retrieval operation by the related information display apparatus of this example shown in FIG. 27.

In the case shown in FIG. 31, an icon 752 is displayed upper left of a display screen 751. A mouse cursor 753 points to the iron 752. A region 754 for explaining the current operation is located upper right of the display screen 751. A trash icon 755 is displayed lower right of the display screen 751. The related information display apparatus of this example retrieves a help message corresponding to the current event sequence as shown in FIG. 16, and displays the help message. In this example, since the mouse cursor 753 points to the icon 752, information related to the icon 752, "Data file", is produced and displayed on the region 754.

In the case shown in FIG. 32, the operation of dragging the icon 752 by the mouse cursor 753 follows the procedure of "moving the mouse cursor to reach the icon and moving the mouse cursor again while the selection button is being pressed". This procedure corresponds to the event sequence "icon—selection—drag". The help message "Dragging the icon" corresponding to this event sequence shown in FIG. 16 is retrieved and displayed on the region 754.

In the case shown in FIG. 33, the procedure of overlapping the icon 752 with the trash icon 755 corresponds to the event sequence "icon—selection—drag—trash". Thus, the help message "Erasing the file" is displayed on the region 754.

In Example 5, a related information type setting section for presetting the type of related information to be displayed may be provided for the selection of related information related to an information unit. Also, a designation range setting section for designating the retrieval range of information newly input or operated may be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for retrieving related word information in an apparatus including: an input device for receiving an input word and control information, a database for storing a plurality of words, and a display device for displaying at least one of the plurality of words, wherein the at least one of the plurality of words stored in the database is retrieved, the method comprising the steps of:

changing a size of a related word information display region on the display device based on the control information;

setting a range of a relation level between the word and a related word related to the word;

determining an information amount of the related word to be displayed on the related word information display region based on the size of the related word information display region and the set relation level range, and determining a type of the related word;

retrieving the related word based on the determined type and the determined information amount; and displaying the retrieved related word on the related word information display region, wherein the information amount of the related word to be displayed on the related word information display region can be changed in real time according to the size of the related word information display region and the set relation level range.

2. A method according to claim 1, further comprising the step of setting a predetermined relation level range when all related words stored in the database and related to the word can be displayed on the related word information display region.

3. A method according to claim 1, further comprising the step of displaying the related word information display region and a relation level range setting region for setting the relation level on the display device when a specific word is input via the input device.

4. A method according to claim 1, wherein a relation level between two words stored in the database is stored in the database.

5. A method according to claim 4, further comprising the step of calculating a relation level between a word which is not stored in the database and a word stored in the database using the relation level stored in the database.

6. An information processing apparatus comprising:

an input device for receiving input information; a display device for displaying information on a display screen; and a database for storing words and information related to the words to allow information related to a related word related to an input word be retrieved, the apparatus further comprising:

a display region setting section for setting a size of a related word information display region for displaying the information related to the related word on the display screen depending on an input via the input device;

a relation level range setting section for setting a range of a relation level between the word and a related word related to the word;

a display controller for displaying the related word information display region of which size has been set on the display screen; and a display information determining section for determining a type of a related word to be displayed on the related word information display region and an information amount of the related word, wherein a related word is retrieved from words belonging to the determined type with the determined information amount and wherein the information amount of the related word to be displayed on the related word information display region can be changed in real time.

7. A related information display apparatus comprising:

an information memory for storing reference information, specific related information, and general information;

a display for displaying information stored in the information memory on a display screen;

a pointing device for pointing to a position on the display screen designated by a user;

an operation processor for controlling to secure an information unit of the reference information displayed at the pointed position, select related information related to the information unit from the specific related information and the general information stored in the information memory at at least one stage, and display the selected related information on the display screen of the display, wherein the related information display apparatus can be controlled in real time.

8. A related information display apparatus comprising:

an information memory for storing reference information, specific related information, and general information;

a display for displaying information stored in the information memory on a display screen;

a pointing device for pointing to a designated position on the display screen;

a designated position securing section for securing the pointed position;

an information securing section for securing a portion of the reference information displayed at the secured designated position;

a related information selector for selecting related information related to the portion of the reference information from the specific related information and the general information stored in the information memory at at least one stage; and a related information display controller for controlling to display the selected related information on the display screen of the display, wherein the related information display apparatus can be controlled in real time.

9. A related information display apparatus comprising:

an information memory for storing specific related information and general information;

a display for displaying information stored in the information memory on a display screen;

an input section for receiving input information;

a detector for detecting the input information;

an operation processor for controlling to select related information related to the input information from the specific related information and the general information stored in the information memory at at least one stage and display the selected related information on the display screen of the display, wherein the related information display apparatus can be controlled in real time.

10. A related information display apparatus according to claim 7, wherein the general information includes dictionary information, map information, address information, telephone number information, text information, and image information including motion pictures and photographs.

11. A related information display apparatus according to claim 7, further comprising a range indicator for indicating a securing range of an information unit of the reference information displayed at the pointed position.

12. A related information display apparatus according to claim 9, further comprising a type setting section for presetting a type of related information to be displayed on the display screen.

13. A method for controlling related information display, comprising the steps of:

displaying reference information on a display screen of a display;

selecting related information related to a portion of the reference information displayed at a designated position from specific reference information and general information stored in an information memory at at least one stage; and displaying the selected related information on the display screen of the display, wherein the above method can be altered in real time.

14. A method for controlling related information display, comprising the steps of:

detecting whether or not information has been input;

selecting related information related to the information from specific reference information and general information stored in an information memory at at least one stage; and displaying the selected related information on a display screen, wherein the above method can be altered in real time.

15. A method for controlling related information display, comprising the steps of:

detecting whether or not operation has been conducted;

selecting related information related to a content of the operation from specific reference information and general information stored in an information memory at at least one stage; and displaying the selected related information on a display screen, wherein the above method can be altered in real time.

* * * * *